(12) United States Patent
Hasegawa

(10) Patent No.: US 10,992,506 B2
(45) Date of Patent: Apr. 27, 2021

(54) TRANSMISSION DEVICE, RECEIVING DEVICE, TRANSMISSION METHOD, CONTROL CIRCUIT, AND RECORDING MEDIUM

(71) Applicant: Mitsubishi Electric Corporation, Tokyo (JP)

(72) Inventor: Fumihiro Hasegawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/962,912

(22) PCT Filed: Jan. 31, 2018

(86) PCT No.: PCT/JP2018/003270
§ 371 (c)(1),
(2) Date: Jul. 17, 2020

(87) PCT Pub. No.: WO2019/150507
PCT Pub. Date: Aug. 8, 2019

(65) Prior Publication Data
US 2021/0067388 A1   Mar. 4, 2021

(51) Int. Cl.
*H04B 7/0456* (2017.01)
*H04L 27/26* (2006.01)
*H04L 5/00* (2006.01)

(52) U.S. Cl.
CPC ........ *H04L 27/2605* (2013.01); *H04L 5/0048* (2013.01); *H04L 27/2626* (2013.01); *H04B 7/0456* (2013.01)

(58) Field of Classification Search
CPC .. H04B 7/0456; H04B 7/0413; H04B 7/0617; H04B 7/0469; H04B 7/0697;
(Continued)

(56) References Cited

U.S. PATENT DOCUMENTS

2013/0279632 A1\* 10/2013 Kim .................. H04L 27/20
                                                                  375/302
2018/0054343 A1\*  2/2018 Suzuki .............. H04L 5/0007
(Continued)

FOREIGN PATENT DOCUMENTS

WO    WO 2017/189316 A1    11/2017

OTHER PUBLICATIONS

Boaz Porat, "A Course in Digital Signal Processing", John Wiley and Sons Inc., 1997, pp. 106-107.
(Continued)

*Primary Examiner* — Eva Y Puente
(74) *Attorney, Agent, or Firm* — Birch, Stewart, Kolasch & Birch, LLP.

(57) ABSTRACT

A transmission device includes a data generation unit to generate a data symbol, a linear processing unit to generate an additional symbol, a power conditioning unit to perform power conditioning on the additional symbol, a frequency-domain multiplexing unit to arrange the additional symbol after the power conditioning and the data symbol along a frequency axis, a conversion unit to convert a signal arranged along the frequency axis by the frequency-domain multiplexing unit into a time domain signal, and a transmission processing unit to transmit the time domain signal. The linear processing unit generates the additional symbol to cause a data portion in a predetermined position in a block, which is a transmission unit of the time domain signal, to be set as a predetermined data group.

30 Claims, 21 Drawing Sheets

(58) Field of Classification Search
CPC .. H04B 7/0486; H04B 7/0639; H04B 7/0626; H04B 7/10; H04B 7/04; H04B 7/0404; H04B 7/0417; H04B 7/0615; H04B 7/046; H04B 7/0478; H04B 7/0682; H04B 7/086; H04B 7/0452; H04L 5/0048; H04L 5/0023; H04L 5/0007; H04L 5/0051; H04L 5/0053; H04L 25/0226; H04L 27/2602; H04L 25/03942; H04L 5/005; H04L 1/0071; H04L 25/0222; H04L 27/26; H04L 27/2601; H04L 27/36; H04L 1/0003; H04L 1/0045; H04L 1/005; H04W 72/042; H04W 72/04; H04W 72/005; H04W 72/0446; H04W 72/0413; H04W 16/28; H04W 52/146; H04W 52/325; H04W 72/044; H04W 4/06; H04W 52/14; H04W 52/24; H04W 52/242; H04W 52/32; H04W 72/046; H04W 72/0473; H04W 72/085; H04W 72/12
USPC .................................................. 375/262, 302
See application file for complete search history.

(56) References Cited

U.S. PATENT DOCUMENTS

2019/0223026 A1* 7/2019 Hasegawa ............. H04W 16/14
2020/0228378 A1* 7/2020 Hasegawa ........... H04L 27/2636

OTHER PUBLICATIONS

Huemer et al., "The Potential of Unique Words in OFDM", in Proc. 15th Int. OFDM Workshop, Hamburg, Germany, Sep. 2010, pp. 140-144.
InterDigital Communications, "Design consideration on waveform in UL for New Radio systems", R1-162925, 3GPP TSG RAN WG1 Meeting #84bis, Busan, Korea, Apr. 11-15, 2016, total 33 pages.
Zou et al., "COFDM: An overview", IEEE Transactions on Broadcasting, vol. 41, No. 1, Mar. 1995, pp. 1-8.
Extended European Search Report for European Application No. 18904284.9, dated Nov. 20, 2020.
Huemer et al., "Non-Systematic Complex Number RS Coded OFDM by Unique Word Prefix," IEEE Transactions on Signal Processing, vol. 60, No. 1, Jan. 1, 2012, pp. 285-299, XP011389741.
Mitsubishi Electric, "Analysis of UW-DFT-s-OFDM," 3GPP TSG RAN WG1 Meeting #88bis, R1-1705820, Spokane, USA, Apr. 3-7, 2017, 7 pages, XP051243932.
Rajabzadeh et al., "Power Spectrum Characterization of Systematic Coded UW-OFDM Systems," 2013 IEEE 78th Vehicular Technology Conference, Sep. 2, 2013, pp. 1-5, XP032548633.
Tran et al., "Unique Word Based Frequency Domain Equalization with Noise Prediction," IEEE Communications Letters, vol. 12. No. 10, Oct. 1, 2008, pp. 785-787, XP011236176.

* cited by examiner

TRANSMISSION DEVICE, RECEIVING DEVICE, TRANSMISSION METHOD, CONTROL CIRCUIT, AND RECORDING MEDIUM

FIELD

The present invention relates to a transmission device that transmits a signal generated using spatial multiplexing, to a receiving device for receiving a signal transmitted from this transmission device, to a transmission method, to a control circuit, and to a recording medium.

BACKGROUND

A digital communication system may suffer from frequency selectivity and temporal variation in the transmission channel due to multipath fading caused by reflection of transmission signal on a building and/or the like, or due to Doppler shifts caused by movement of a terminal. A multipath fading environment makes a reception signal a signal subject to interference between a transmitted symbol and a symbol arrived after a delay time.

To achieve a best reception characteristic in such a frequency selective transmission channel, an orthogonal frequency division multiplexing (OFDM) transmission scheme (see, e.g., Non-Patent Literature 1 listed below) is used which provides multi-carrier (MC) block transmission.

Non-Patent Literature 1 listed below discloses a technology of placing a unique word (UW), which is a fixed sequence, in a transmission signal in the OFDM transmission scheme to avoid inter-symbol interference.

CITATION LIST

Non-Patent Literature

Non-Patent Literature 1: M. Huemer, C. Hofbauer, and J. B. Huber, "The Potential of Unique Words in OFDM," in Proc. of 15th Int. OFDM Workshop, Hamburg, Germany, September 2010, pp. 140-144.

SUMMARY

Technical Problem

The technology described in Non-Patent Literature 1 listed above causes a symbol to be added in frequency domain to provide zero electrical power (hereinafter referred to simply as power) in a position in which the fixed sequence is inserted. In the technology described in Non-Patent Literature 1 listed above, addition of a symbol in frequency domain causes transmitted power to have a frequency characteristic different from the frequency characteristic when no symbol is added. This presents a problem of possibility that the spectral mask, which is a criterion relating to the frequency characteristic of power required by a standard or the like, is not satisfied.

The present invention has been made in view of the foregoing, and it is an object of the present invention to provide a transmission device capable of reducing or preventing a deviation from a criterion relating to the transmitted power.

Solution to Problem

To solve the problem and achieve the object described above, a transmission device according to an aspect of the present invention includes: a data generation unit to generate a data symbol; a linear processing unit to generate an additional symbol; a power conditioning unit to perform power conditioning on the additional symbol; and an arrangement unit to arrange the additional symbol after the power conditioning and the data symbol along a frequency axis. The transmission device further includes: a conversion unit to convert a signal arranged along the frequency axis by the arrangement unit into a time domain signal; and a transmission processing unit to transmit the time domain signal. The linear processing unit generates the additional symbol to cause a data portion in a predetermined position in a block to be set as a predetermined data group, the block being a transmission unit of the time domain signal.

Advantageous Effects of Invention

A transmission device according to the present invention provides an advantage in being capable of reducing or preventing a deviation from a criterion relating to the transmitted power.

DESCRIPTION OF EMBODIMENTS

A transmission device, a receiving device, a transmission method, a control circuit, and a recording medium according to embodiments of the present invention will be described in detail below with reference to the drawings. Note that these embodiments are not intended to limit the scope of this invention.

First Embodiment

Figure 1:
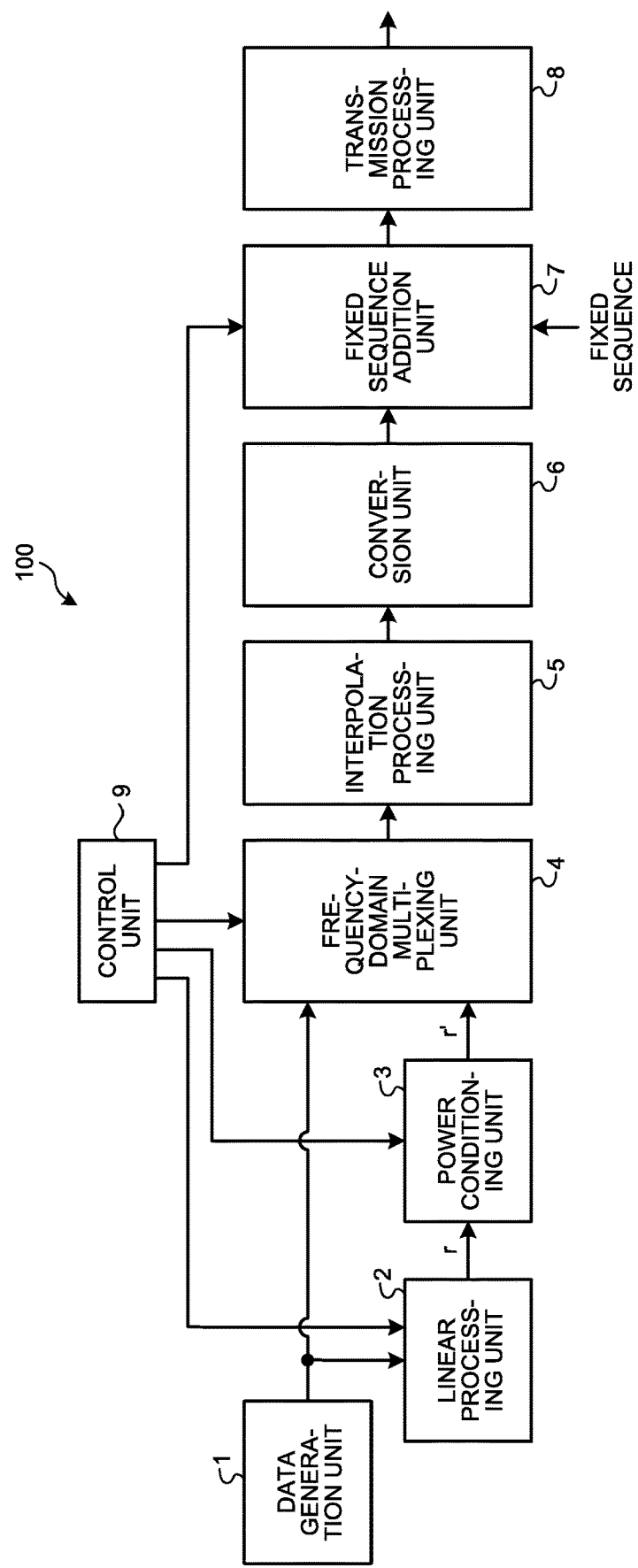
FIG. 1 is a diagram illustrating an example configuration of a transmission device according to a first embodiment.

FIG. 1 is a diagram illustrating an example configuration of a transmission device according to a first embodiment of the present invention. A transmission device 100 of the present embodiment transmits a signal using an OFDM transmission scheme. The transmission device 100 includes, as illustrated in FIG. 1, a data generation unit 1, a linear processing unit 2, a power conditioning unit 3, a frequency-domain multiplexing unit 4, an interpolation processing unit 5, a conversion unit 6, a fixed sequence addition unit 7, a transmission processing unit 8, and a control unit 9.

The data generation unit 1 generates a data symbol. The data symbol is, for example, a modulation symbol such as a phase shift keying (PSK) symbol or a quadrature amplitude modulation (QAM) symbol, but the data symbol is not limited thereto. The data generation unit 1 may also generate a data symbol by performing at least one of error correction processing and precoding processing on the modulation symbol. The precoding processing can be general precoding processing for use in an OFDM scheme. The data generation unit 1 generates $N_D$ data symbols per block. The data generation unit 1 outputs the data symbols generated, to the frequency-domain multiplexing unit 4 and to the linear processing unit 2.

The linear processing unit 2 performs linear processing to cause a portion in a specified position in a signal in time domain output from the conversion unit 6 downstream thereof to provide zero power. Specifically, the linear processing unit 2 generates an additional symbol to cause a data portion in a predetermined position in a block, which is a transmission unit of a time domain signal output from the conversion unit 6, to be set as a predetermined data group. In the first embodiment, the data group is a zero-sequence consisting of all zeros. The linear processing generates M additional symbols per OFDM-unit data. The predetermined position described above in a time domain signal output from the conversion unit 6, that is, the section in which power is zero, is also hereinafter referred to as zero-power section. A zero-power section in time domain is a position where a fixed sequence described later is placed, and is specified by the control unit 9. The linear processing will be described later. The linear processing unit 2 outputs the additional symbol generated, to the power conditioning unit 3.

The power conditioning unit 3 performs power conditioning on the additional symbol, and outputs the additional symbol after the power conditioning to the frequency-domain multiplexing unit 4. Power conditioning is performed for purposes of reducing or preventing a variation in the power among subcarriers in frequency domain. As described later, the transmission device 100 of the present embodiment generates a transmission signal by multiplexing the data symbol and the additional symbol in the frequency-domain multiplexing unit 4. Accordingly, when power differs between the additional symbol and the data symbol, and a standard or the like provides for a spectral mask, which represents an upper limit of the transmitted power of each frequency band, such difference in power may hamper the requirement on the spectral mask from being satisfied. Thus, in the present embodiment, the power is conditioned by the power conditioning unit 3.

The frequency-domain multiplexing unit 4 assigns the data symbol input from the data generation unit 1 and the additional symbol output from the power conditioning unit 3 to the frequencies specified by the control unit 9, thus to multiplex these symbols in frequency domain. That is, the frequency-domain multiplexing unit 4 is an arrangement unit that arranges the additional symbol after the power conditioning and the data symbol along the frequency axis. In more detail, in each OFDM-unit data, the frequency-domain multiplexing unit 4 assigns the $N_D$ data symbols and M additional symbols respectively to subcarriers specified by the control unit 9. The frequency-domain multiplexing unit 4 outputs the symbols after multiplexing, to the interpolation processing unit 5. Note that a relationship of $N_D+M \leq N$ is assumed, where N (N is an integer greater than or equal to 2) represents the total number of subcarriers that the transmission device 100 can use in the OFDM transmission scheme. In addition, to protect a signal being processed from leak interference from an adjacent frequency bin in frequency domain, the frequency-domain multiplexing unit 4 may perform zero insertion processing and/or the like. For example, Long Term Evolution (LTE) standard defines $N_D=1200$ and $N=2048$.

The interpolation processing unit 5 performs interpolation processing to adjust the number of symbols output from the conversion unit 6 downstream thereof to X (X is an integer satisfying $X \geq N$). One example of interpolation processing provided in the interpolation processing unit 5 is interpolation processing that provides recursive cyclicity in the phase in a block, which is a data unit corresponding to one interpolated OFDM-unit data. For example, interpolation processing using a signal interpolation equation described in "A Course in Digital Signal Processing" (B. Porat, John Wiley and Sons, Inc., 1997) (hereinafter referred to as Porat Document), and/or the like will generate recursive cyclicity in the phase in a block. The term "recursive cyclicity" specifically refers to a phenomenon that continuity exists between the phase of $y_0$ and the phase of $y_{X-1}$, where the signals in a block are $y_0, y_1, \ldots, y_{X-1}$. That is, the interpolation processing unit 5 is configured to perform interpolation processing to allow the phase to continue between the tail of a block and the head of the block. In general, the number of symbols after interpolation processing is an integer multiple of the number of symbols input to the interpolation processing unit 5. For example, the number of symbols output from the interpolation processing unit 5 is L×N, where N represents the number of symbols input to the interpolation processing unit 5. L is an integer greater than or equal to 1. L equal to 1 means that the number of input symbols and the number of output symbols are equal to each other, and such case is also referred to as interpolation processing in the present embodiment. The interpolation processing unit 5 outputs the symbols after interpolation processing to the conversion unit 6. A symbol after interpolation processing is a result of interpolation of a symbol arranged in frequency domain, and is therefore a frequency domain signal.

The conversion unit 6 converts the signal arranged along the frequency axis by the frequency-domain multiplexing unit 4, into a time domain signal. Specifically, the conversion unit 6 converts the frequency domain signal after being interpolated by the interpolation processing unit 5, into a time domain signal, and outputs the time domain signal to the fixed sequence addition unit 7. Note that L may be 1 as described above, meaning that interpolation processing may not necessarily be performed. Examples of conversion processing performed in the conversion unit 6 include inverse discrete Fourier transform (IDFT) and inverse fast Fourier transform (IFFT), but the process to convert the frequency domain signal into the time domain signal is not limited thereto.

The fixed sequence addition unit 7 places a fixed sequence, which is an example of the predetermined sequence according to the present invention, in the time domain signal output from the conversion unit 6, and outputs the time domain signal after the placement of the fixed sequence to the transmission processing unit 8. The predetermined sequence may also be hereinafter referred to as added sequence. The present embodiment assumes that an added sequence is a fixed sequence. Specifically, the fixed sequence addition unit 7 receives specification of the position to place the fixed sequence from the control unit 9, and adds the fixed sequence in that position in the time domain signal output from the conversion unit 6, that is, in a predetermined position in the time domain signal. The position to place the fixed sequence specified by the control unit 9 is the zero-power section described above. The fixed sequence may be generated on a per-block basis, i.e., for each OFDM-unit data, or the same fixed sequence may be used in multiple blocks. Use of the same fixed sequence in all blocks and insertion of the fixed sequence in the same place have an effect of allowing the phase to be continuous between blocks, thereby allowing out-of-band power to be reduced.

The fixed sequence may be any sequence. For example, a Zadoff-Chu sequence, a sequence output from a pseudo noise generator, or the like may also be used. In addition, the transmission device 100 of the present embodiment transmits an OFDM signal, which intrinsically results in a high peak to average power ratio (PAPR), i.e., a large difference between the peak power and the average power, of the OFDM signal. Accordingly, a signal having a PAPR characteristic equivalent to the PAPR characteristic of an OFDM signal may also be used as a fixed sequence. For example, a PSK signal, a QAM signal, or the like may be transformed by IDFT or DFT transform to generate a fixed sequence.

The transmission processing unit 8 performs filtering processing, digital-to-analog conversion processing, frequency conversion processing, power amplification processing, and/or the like on the time domain signal output from the fixed sequence addition unit 7, and transmits the time domain signal processed. Note that, in a case in which the transmission device 100 is a wireless communication device, the transmission processing unit 8 includes an antenna for emitting a radio wave, and the processed signal is emitted from the antenna. Note that the transmission device 100 is not limited to a wireless communication device, but may also transmit a signal via wired transmission.

Figure 2:
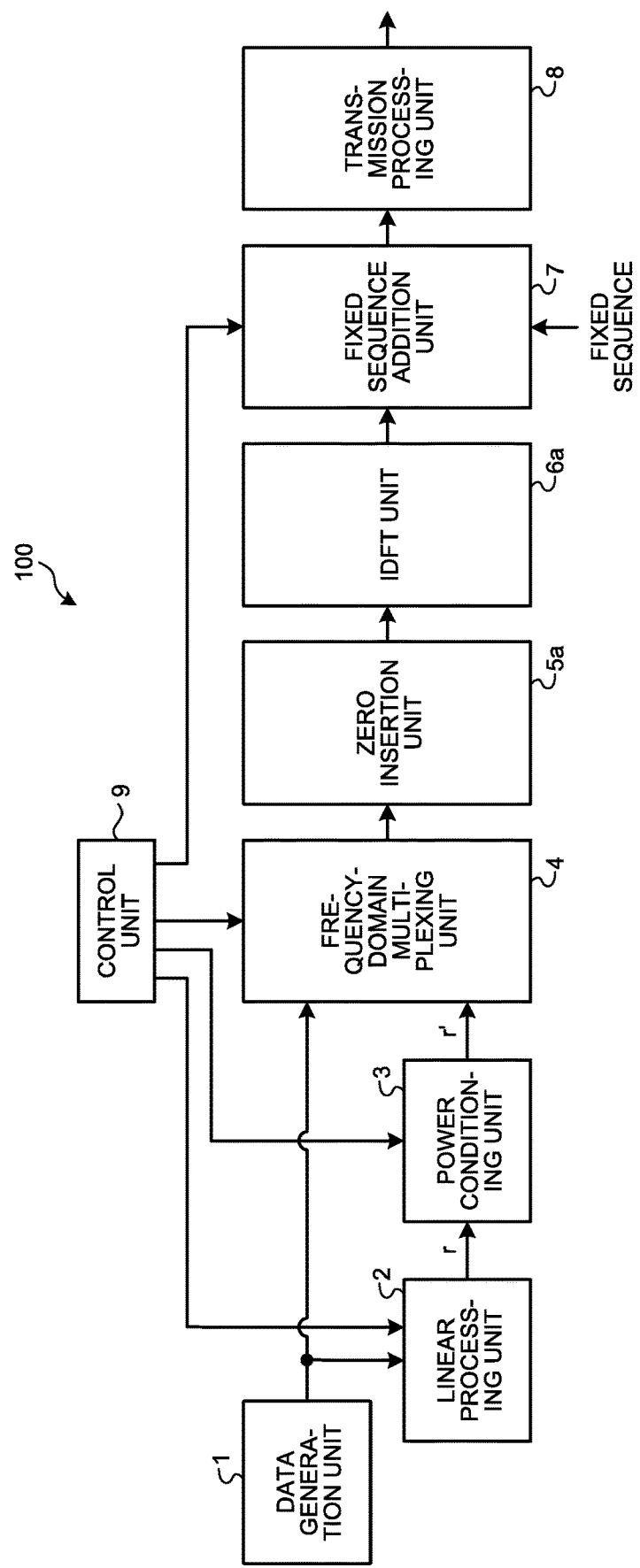
FIG. 2 is a diagram illustrating a specific example of the interpolation processing unit and of the conversion unit of the transmission device of the first embodiment.

FIG. 2 is a diagram illustrating a specific example of the interpolation processing unit 5 and of the conversion unit 6 of the transmission device 100 of the present embodiment. The example illustrated in FIG. 2 is provided as an example in which a zero insertion unit 5a and an IDFT unit 6a are used as the interpolation processing unit 5 and as the conversion unit 6 illustrated in FIG. 1. In FIG. 2, elements having the same functionality as the functionality of elements illustrated in FIG. 1 are designated by the same reference characters as used in FIG. 1. In the example illustrated in FIG. 2, the zero insertion unit 5a performs zero insertion in frequency domain that is described as interpolation processing in Porat Document, and the IDFT unit 6a converts the frequency domain signal into the time domain signal using an IDFT process. FIG. 2 merely illustrates an example, and the implementation of the interpolation processing unit 5 and of the conversion unit 6 is not limited to the example illustrated in FIG. 2.

Figure 3:
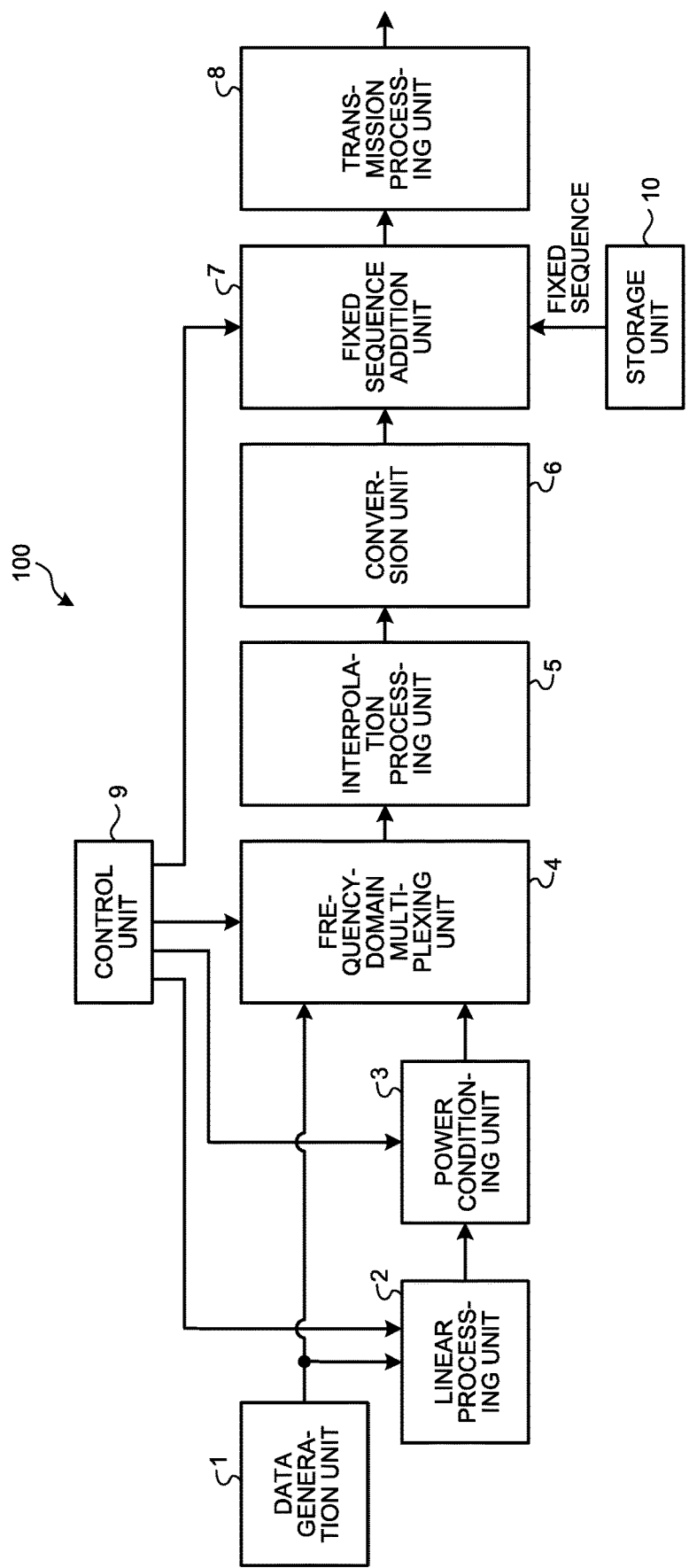
FIG. 3 is a diagram illustrating a specific example of a configuration of the transmission device of the first embodiment.

FIG. 3 is a diagram illustrating a specific example of a configuration of the transmission device 100 of the present embodiment. The example illustrated in FIG. 3 depicts an example configuration of the transmission device 100 that uses the same fixed sequence in multiple blocks. In FIG. 3, elements having the same functionality as the functionality of elements illustrated in FIG. 1 are designated by the same reference characters as used in FIG. 1. In the case in which the same fixed sequence is used in multiple blocks, the transmission device 100 can be configured such that the fixed sequence is previously stored in a storage unit 10. In this case, the fixed sequence is read from the storage unit 10 by the fixed sequence addition unit 7.

Linear processing of the present embodiment will next be described. Linear processing of the present embodiment can be, for example, the linear processing described in Non-Patent Literature 1 described above. The foregoing additional symbol corresponds to the redundant subcarriers in Non-Patent Literature 1 described above.

By way of example, assume that L in the interpolation processing is 1, $N_D+M=N$, and $X=N$. Also assume that the linear processing unit 2 performs linear processing such that M pieces of data in a specified position will provide zero power in the data output from the conversion unit 6. The control unit 9 specifies the above position to the linear processing unit 2. Letting now $W_N$ denote an N row by N column (hereinafter expressed as N×N) IDFT matrix, the (m, n)th element of the matrix $W_N$ has a value of $e^{j2\pi mn/N}$. Let a matrix P be a matrix that represents how the data symbols and the additional symbols after the power conditioning are arranged in frequency domain. That is, it is assumed that the frequency-domain multiplexing unit 4 multiplies, by the matrix P, an $(N_D+M)\times 1$ vector including the data symbols followed by the additional symbols after the power conditioning, and thus arranges the data symbols and the additional symbols after the power conditioning in frequency domain. It is also assumed that the specified position described above is the last portion of the time domain signal. Under these assumptions, the matrix representing the arrangement performed by the frequency-domain multiplexing unit 4 and the conversion from frequency domain to time domain performed by the conversion unit 6 is expressed as Formula (1) below. The matrix P is determined by the control unit 9.

[Formula 1]

$$W_N P = \begin{bmatrix} M_{11} & M_{12} \\ M_{21} & M_{22} \end{bmatrix} \quad (1)$$

In Formula (1) above, $M_{21}$ is an $M \times N_D$ matrix, and $M_{22}$ is an $M \times M$ matrix. When the last M pieces of data are configured to provide zero power, an $M \times 1$ vector r representing the M additional symbols, which is an output of the linear processing unit 2, is expressed by Formula (2) below, where d is an $N_D \times 1$ data symbol vector.

[Formula 2]

$$r = -M_{22}^{-1} M_{21} d \quad (2)$$

Note that, assuming that no power conditioning is performed, that is, r'=r in the example described above, the processing in the frequency-domain multiplexing unit 4 can be expressed by Formula (3) below, where r' is the vector r after the power conditioning.

[Formula 3]

$$P \cdot \begin{bmatrix} d \\ r \end{bmatrix} \quad (3)$$

As described above, multiplexing of the additional symbol may cause the spectral mask to be unsatisfied. Thus, as described above, power conditioning needs to be performed on the symbol that has undergone the linear processing. The power conditioning in the power conditioning unit 3 can be expressed by Formula (4) below.

$$r' = \alpha \cdot r \quad (4)$$

In the formula, α has a value less than or equal to 1, and is set to satisfy a preset power criterion such as the spectral mask. The power criterion is a criterion of the average power of multiple symbols, or the like. For example, the value of α can be selected to make the average power of the data symbols equal to the average power of the additional symbols after the power conditioning. Note that when no power conditioning is required, α may be set to 1. The value of α is specified by the control unit 9. The control unit 9 can determine the value of α on the basis of, for example, a signal power limit value, performance of a base station, and/or the like.

In addition, as shown by Formula (5) below, a phase rotation may be provided to the power-conditioned signal, where θ represents the amount of phase rotation.

$$r' = e^{j\theta} \cdot \alpha \cdot r \quad (5)$$

Moreover, a phase rotation may also be provided to cyclically shift the zero-power section specified, along the time axis. In this case, unlike the phase rotation example given by Formula (5) above, a vectorial phase rotation is provided such as one described in Porat Document. A matrix operation that generates a cyclic shift can be expressed by Formula (6) below, where D is a matrix that provides a phase rotation and whose diagonal entries include the phase rotation.

[Formula 4]

$$DP \cdot \begin{bmatrix} d \\ \alpha \cdot r \end{bmatrix} \quad (6)$$

Figure 4:
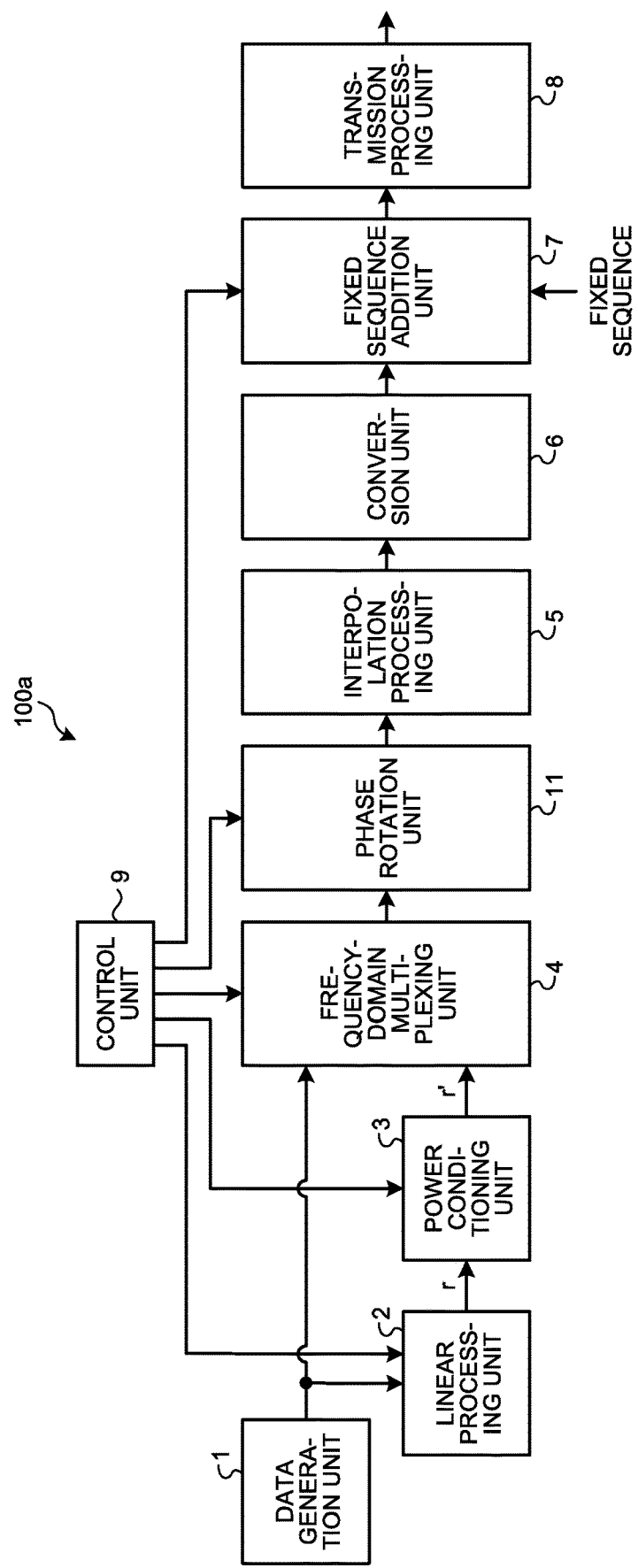
FIG. 4 is a diagram illustrating an example configuration of the transmission device that performs phase rotation after processing by the frequency-domain multiplexing unit, of the first embodiment.

Note that the operation of providing a phase rotation for cyclic shifting, that is, the process of multiplication by the above matrix D, can be performed after the processing by the frequency-domain multiplexing unit 4. FIG. 4 is a diagram illustrating an example configuration of the transmission device that performs phase rotation after the processing by the frequency-domain multiplexing unit 4. In FIG. 4, elements having the same functionality as the functionality of elements illustrated in FIG. 1 are designated by the same reference characters as used in FIG. 1. A transmission device 100a illustrated in FIG. 4 includes a phase rotation unit 11, and the phase rotation unit 11 performs phase rotation on the signal output from the frequency-domain multiplexing unit 4. The amount of phase rotation in this phase rotation is specified by the control unit 9. In this phase rotation, when a signal in the time domain is to be cyclically shifted by k (k is an integer greater than or equal to 1) symbol(s), the (m, m)th element of D has a value of $e^{j2\pi km/N}$, and the (m, n)th element of D is zero when m≠n. Cyclic shifting enables the zero-power section in the time domain to move. Note that, in this example, the amount of phase rotation has been described as causing a cyclic shift to occur in time domain, but the amount of phase rotation may also be provided to create another effect such as peak power reduction or out-of-band power reduction, in time domain.

In addition, the foregoing example has been described in terms of an example in which the fixed sequence addition unit 7 places the fixed sequence in a specified position, but the placement of the fixed sequence by the fixed sequence addition unit 7 may not necessarily be performed. Performing linear processing to cause a data portion in a specified position to provide zero power causes the data portion in the specified position in the transmission signal to provide zero power. As such, providing a zero-power section, which is a section of zero power, allows a receiving device to perform antenna switching, interference measurement, and/or the like within the zero-power section. The fixed sequence addition unit 7 may be instructed by the control unit 9 about whether to add the fixed sequence or not. The control unit 9 may determine whether to add the fixed sequence or not based on a request within the transmission device 100 or from a receiving device. For example, when a receiving unit (not illustrated) receives a request for interference measurement from a receiving device, the control unit 9 instructs the fixed sequence addition unit 7 not to add the fixed sequence. This causes a zero-power section to be provided, and thus allows a receiving device that has received a signal transmitted from the transmission device 100 to perform interference measurement in the zero-power section. In addition, when antenna switching is requested between OFDM units of data within the transmission device 100, the control unit 9 instructs the fixed sequence addition unit 7 not to add the fixed sequence. Note that the request for antenna switching between OFDM units of data within the transmission device 100 is determined based on an instruction from a higher layer such as, for example, a network control unit not illustrated. The foregoing example has been described in terms of the transmission device 100 as an example, but this example similarly applies to the transmission device 100*a*.

A hardware configuration of the transmission devices 100 and 100*a* will next be described. The transmission processing unit 8 of the transmission devices 100 and 100*a* is a transmitter. The data generation unit 1, the linear processing unit 2, the power conditioning unit 3, the frequency-domain multiplexing unit 4, the interpolation processing unit 5, the conversion unit 6, the fixed sequence addition unit 7, and the control unit 9 of the transmission devices 100 and 100*a* are implemented in a processing circuit. The transmission processing unit 8 may also be partially implemented in a processing circuit.

Figure 5:
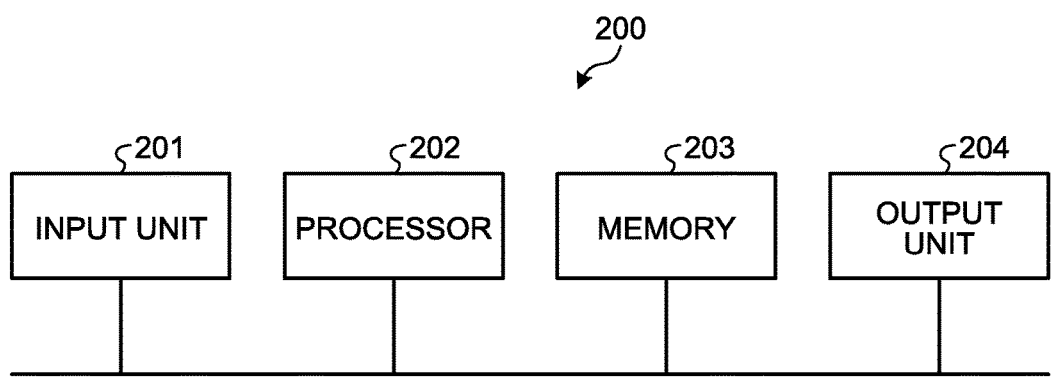
FIG. 5 is a diagram illustrating an example configuration of a control circuit including a processor, of the first embodiment.

The above processing circuit may be a control circuit including a processor, or may be a dedicated hardware element. FIG. 5 is a diagram illustrating an example configuration of a control circuit including a processor. A control circuit 200 includes an input unit 201, which is a receiving unit that receives data input from an external device, a processor 202, a memory 203, and an output unit 204, which is a transmission unit that transmits data to an external device. The input unit 201 is an interface circuit that receives data input from outside the control circuit, and provides the data to the processor 202. The output unit 204 is an interface circuit that transmits data from the processor 202 or from the memory 203 to outside the control circuit. In a case in which at least part of the components of the transmission devices 100 and 100*a* are implemented in the control circuit illustrated in FIG. 5, such components are implemented by the processor 202 by reading and executing a program corresponding to each component of the transmission devices 100 and 100*a*, stored in the memory 203. The memory 203 is also used as a temporary memory for processes performed by the processor 202.

The processor 202 is a central processing unit (CPU; also referred to as central processing unit, processing unit, computing unit, microprocessor, microcomputer, processor, and digital signal processor (DSP)). The memory is, for example, a non-volatile or volatile semiconductor memory, such as a random access memory (RAM), a read-only memory (ROM), a flash memory, an erasable programmable read-only memory (EPROM), or an electrically erasable programmable read-only memory (EEPROM) (registered trademark), a magnetic disk, a flexible disk, an optical disk, a compact disc, a MiniDisc, a digital versatile disk (DVD), or the like.

Figure 6:
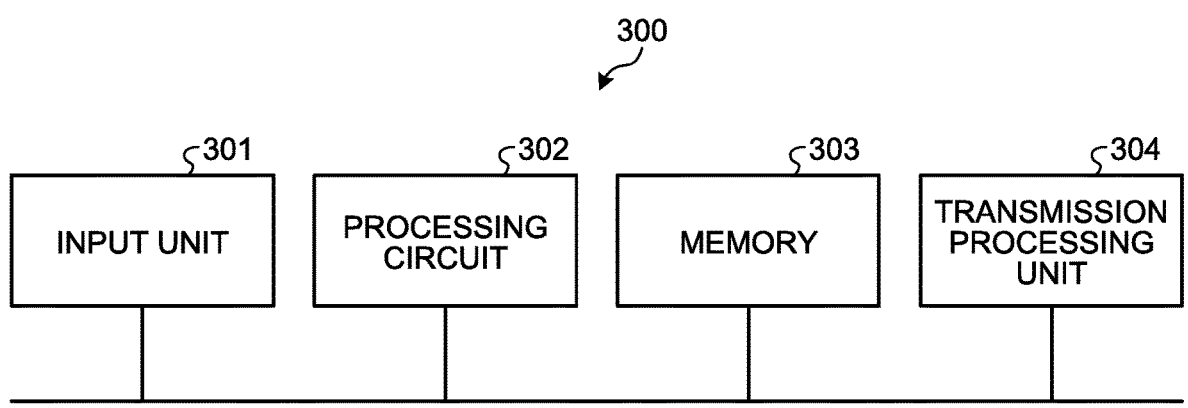
FIG. 6 is a diagram illustrating an example configuration of a circuit including a processing circuit that is a dedicated hardware element, of the first embodiment.

In a case in which the above processing circuit is configured as a dedicated hardware element, the components implemented in a processing circuit are the circuit illustrated in FIG. 6. FIG. 6 is a diagram illustrating an example configuration of a circuit including the processing circuit that is a dedicated hardware element. A circuit 300 illustrated in FIG. 6 includes an input unit 301, a processing circuit 302, a memory 303, and a transmission processing unit 304. The input unit 301 is a receiving unit that receives data input from an external device. The transmission processing unit 304 is a transmission unit that transmits data to an external device. The processing circuit 302 is a single circuit, a set of multiple circuits, a programmed processor, a set of programmed processors, an application specific integrated circuit (ASIC), a field programmable gate array (FPGA), or a combination thereof.

Each of the components included in the transmission devices 100 and 100*a* may be implemented by a combination of a control circuit and a processing circuit that is a dedicated hardware element.

Note that an additional symbol may be assigned to an idle subcarrier, which is a subcarrier unused for transmission, among available subcarriers. Use of an idle subcarrier can prevent reduction in transmission efficiency.

As described above, the transmission device of the present embodiment performs linear processing to cause a data portion in a specified position in the transmission signal to provide zero power, performs power conditioning on the additional symbol generated by the linear processing, and multiplexes the additional symbol after the power conditioning and the data symbol in frequency domain. The transmission device of the present embodiment then converts the multiplexed signal into a time domain signal, and transmits the time domain signal. This can reduce or prevent a deviation from a criterion relating to the transmitted power. In addition, the added sequence can be used as a guard interval.

Second Embodiment

Figure 7:
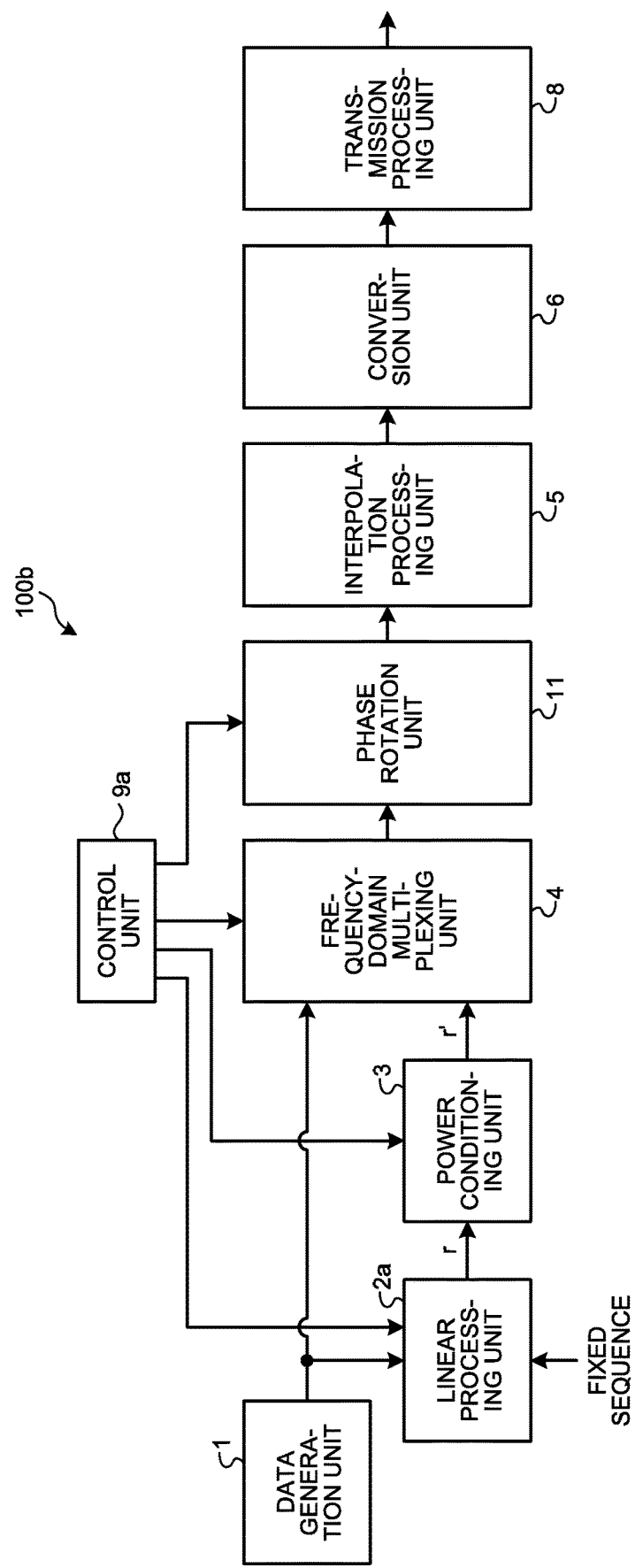
FIG. 7 is a diagram illustrating an example configuration of a transmission device according to a second embodiment.

FIG. 7 is a diagram illustrating an example configuration of a transmission device according to a second embodiment of the present invention. A transmission device 100*b* of the present embodiment includes a linear processing unit 2*a* and a control unit 9*a* in place of the linear processing unit 2 and the control unit 9, respectively, of the transmission device 100 of the first embodiment. In addition, the transmission device 100*b* of the present embodiment differs from the transmission device 100 of the first embodiment in that the phase rotation unit 11 is added downstream of the frequency-domain multiplexing unit 4, and the fixed sequence addition unit 7 is removed. The other part of the transmission device 100*b* of the present embodiment is similar to the transmission device 100 of the first embodiment. Elements having functionality similar to the functionality of the first embodiment are designated by the same reference characters as corresponding ones of the first embodiment, and duplicate description thereof will be omitted. The following description primarily describes differences from the first embodiment.

The first embodiment has been described in terms of an example in which the linear processing unit 2 generates an additional symbol to enable the conversion unit 6 to provide a zero-power section in the time domain signal, and the fixed sequence addition unit 7 places a fixed sequence in the zero-power section in the transmission signal. An example will be described in the present embodiment in which the linear processing unit 2*a* generates an additional symbol to cause a fixed sequence to be placed in the transmission signal. That is, in the present embodiment, upon generation of an additional symbol by the linear processing unit 2*a* to cause a data portion in a predetermined position in a block, which is a transmission unit of the time domain signal, to be set as a predetermined data group, the data group is a fixed sequence that is a predetermined sequence.

By way of example, linear processing to cause M pieces of data at the tail of a block of a time domain signal output from the conversion unit 6 to be set as the fixed sequence will now be described. Assuming that L in the interpolation processing is 1, $N_D+M=N$, and $X=N$, a description will be given using a model expressed by Formula (1). The vector r representing the additional symbols in frequency domain output from the linear processing unit 2*a* in the second embodiment can be expressed by Formula (7) below, where u represents an M×1 vector of fixed sequence corresponding to M symbols at the tail of a block of the time domain signal output from the conversion unit 6.

[Formula 5]

$$r = -M_{22}^{-1} M_{21} d + M_{22}^{-1} u \quad (7)$$

The linear processing unit 2a calculates the additional symbols according to Formula (7), on the basis of the fixed sequence u, to cause the M pieces of data at the tail of a block of the time domain signal output from the conversion unit 6 to be set as the fixed sequence.

The control unit 9a operates similarly to the control unit 9 except that it does not instruct the fixed sequence addition unit 7 about where to place the fixed sequence, but instructs the linear processing unit 2a about where to place the fixed sequence. Note that, similarly to the first embodiment, the fixed sequence may be generated on a per-block basis, or the same fixed sequence may be used in multiple blocks.

The power conditioning unit 3 performs, similarly to the first embodiment, power conditioning according to Formula (4). The phase rotation unit 11 operates similarly to the phase rotation unit 11 of the transmission device 100a of the first embodiment. Note that FIG. 7 illustrates an example configuration including the phase rotation unit 11, but the phase rotation unit 11 may not necessarily be included. In addition, similarly to the first embodiment, an additional symbol may be transferred over an idle subcarrier. The present embodiment does not need to include the fixed sequence addition unit 7.

Third Embodiment

Figure 8:
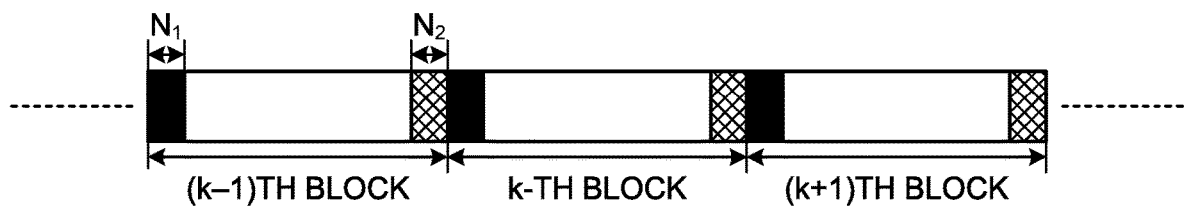
FIG. 8 is a diagram illustrating an example of placement of a fixed sequence at the head and at the tail of each block, of a third embodiment.

A third embodiment will next be described. A transmission device of the present embodiment is configured similarly to the transmission device of the second embodiment. The following description describes differences from the second embodiment. The second embodiment has been described in terms of an example in which the last M pieces of data are set as the fixed sequence, but the fixed sequence may also be placed in multiple positions in a block. FIG. 8 is a diagram illustrating an example of placement of a fixed sequence at the head and at the tail of a block. The example illustrated in FIG. 8 is provided as an example in which $N_1$ fixed sequences are placed at the head of a block, and $N_2$ fixed sequences are placed at the tail of a block. Note that a fixed sequence may be placed in multiple positions also in the first embodiment in a similar manner. In such case, the zero-power section will also appear in multiple positions.

In addition, FIG. 8 illustrates a case where the same fixed sequence is used in all the blocks. Note that the fixed sequences inserted at the head and at the tail may be different from each other, or may be the same. Use of the same fixed sequence in all blocks has an effect of allowing the phase to be continuous between blocks, thereby allowing out-of-band power to be reduced.

As illustrated in FIG. 8, the linear processing unit 2a operates as follows in a case in which the fixed sequence is placed in multiple positions. Moreover, the linear processing unit 2a operates as follows also in a case in which the fixed sequence input to the linear processing unit 2a and the portion corresponding to the fixed sequence in the signal output from the conversion unit 6 have different lengths.

Let the vector u be expressed by Formula (8) below, where the vector u represents the components corresponding to the fixed sequence in the signal output from the conversion unit 6. The matrix A is part of $W_N$, which is an N×N IDFT matrix, and rows in the matrix A correspond to the rows at the positions for the components corresponding to the fixed sequence in the signal output from the conversion unit 6 in the rows of the matrix $W_N$. The matrix A is an M×($N_D$+K) matrix. The vector d is a vector including the data symbols and the fixed sequence, and corresponds to the signal input to the conversion unit 6.

$$u = Ad \quad (8)$$

The matrix A is decomposed as Formula (9) below, where r is a vector representing an output of the linear processing unit 2a, and d' represents the data symbols. The matrix $A_0$ is a matrix having the columns of $A_0$ corresponding to the columns in the matrix A for the data symbols in the signal output from the conversion unit 6. The matrix $A_1$ is a matrix having the columns of $A_1$ corresponding to the columns in the matrix A for the fixed sequence components output from the conversion unit 6.

$$u = A_0 d' + A_1 r \quad (9)$$

In this regard, let M denote the length of u, and K denote the length of r, and assume M<K. In this case, r can be obtained from Formula (10) below.

[Formula 6]

$$r = A_1^H (A_1 A_1^H)^{-1} (u - A_0 d') \quad (10)$$

In addition, when M≥K, r can be obtained from Formula (11) below.

[Formula 7]

$$r = (A_1^H A_1)^{-1} A_1^H (u - A_0 d') \quad (11)$$

Figure 9:
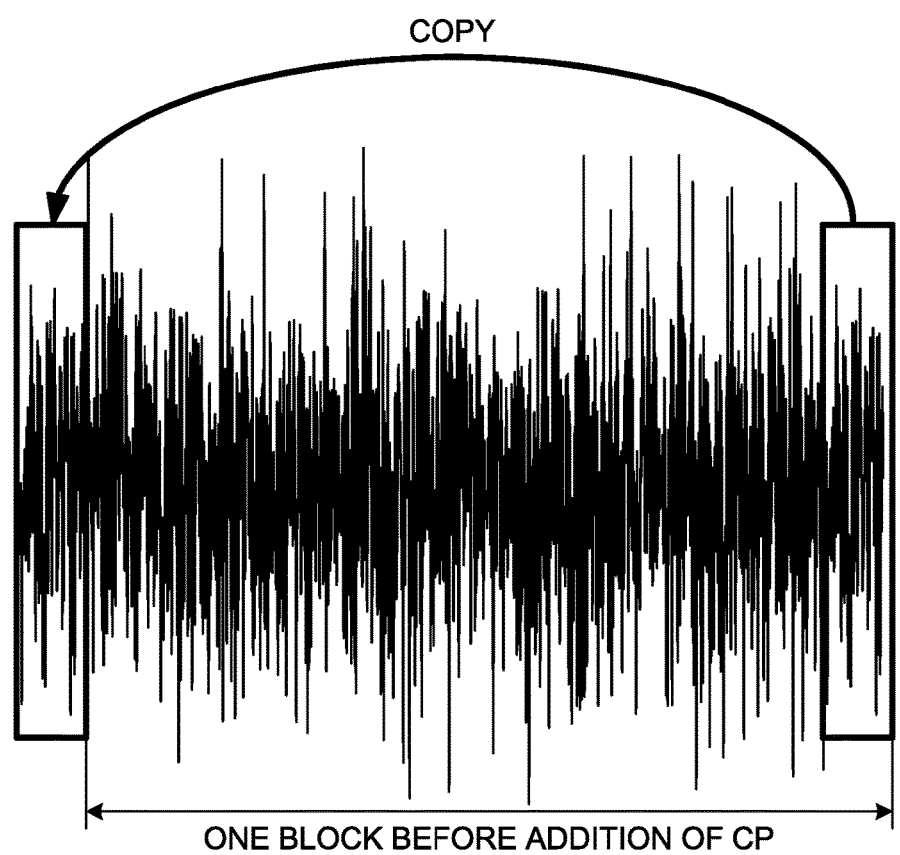
FIG. 9 is a diagram for describing addition of a cyclic prefix (CP), of the third embodiment.

Moreover, the transmission processing unit 8 may perform CP addition. That is, as illustrated in FIG. 9, the transmission processing unit 8 uses a tail portion of a block as the CP, copies that portion, and places that portion at the head of the block. FIG. 9 is a diagram for describing addition of the CP.

The matrix A of Formula (8) has rows formed of the first row and the (N−$N_{CP}$)th row of the IDFT matrix, where $N_{CP}$ represents the length of the CP. If, in consecutive blocks, each block has the same phase and the same amplitude at the head of a block before CP addition and in the position of the head of a portion to be copied as the CP, and also has the same phase and the same amplitude described above across blocks, then, as described in the first embodiment, performing interpolation to provide recursive cyclicity in the phase in a block removes discontinuity of phase across blocks, and can thus reduce out-of-band power.

Furthermore, placement of the fixed sequence in multiple positions in each block can improve continuity of the phase across blocks. For example, the first $N_1$ pieces of data of a block before CP addition are set as a first fixed sequence, and the last $N_2$ pieces of data thereof are set as a second fixed sequence. Next, linear processing is performed such that the head of the first fixed sequence will be placed at the head position of the portion to be copied as the CP. Then, linear processing is performed such that a data portion immediately preceding the portion to be copied as the CP will be the tail of the second fixed sequence.

Figure 10:
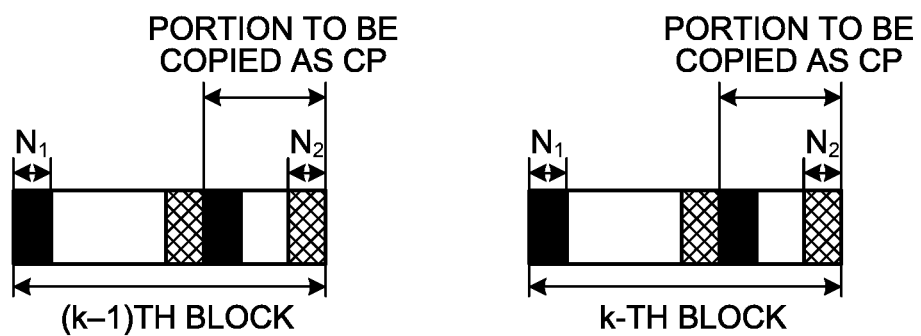
FIG. 10 is a diagram illustrating an example of blocks before CP addition when a fixed sequence is placed in multiple positions in a block, of the third embodiment.

FIG. 10 is a diagram illustrating an example of blocks before CP addition when the fixed sequence is placed in multiple positions in a block. In the example illustrated in FIG. 10, a first fixed sequence, which is $N_1$ pieces of data, is placed at the head of a block, and a second fixed sequence, which is $N_2$ pieces of data, is placed at the tail of a block, and moreover, the first fixed sequence is placed at the head position of the portion to be copied as the CP, and the second fixed sequence is placed such that a data portion immediately preceding the portion to be copied as the CP will be the tail of the second fixed sequence.

Figure 11:
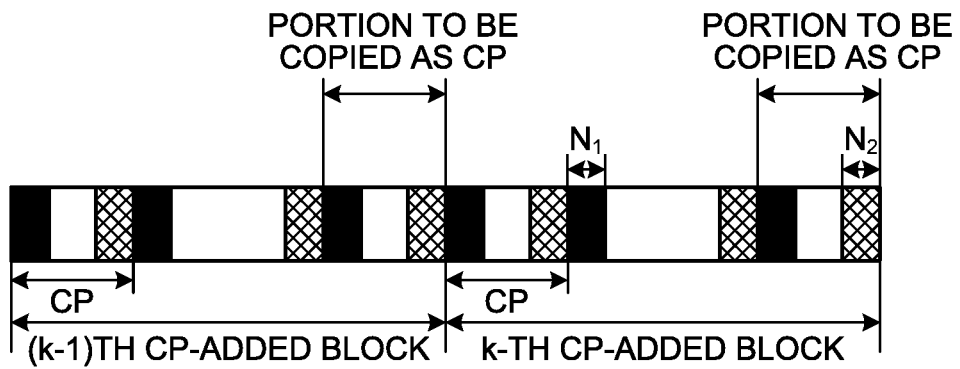
FIG. 11 is a diagram illustrating an example of CP-added block, which is a block after CP addition, of the third embodiment.

FIG. 11 is a diagram illustrating an example of CP-added block, which is a block after CP addition. FIG. 11 illustrates what is obtained by CP addition to the blocks illustrated in FIG. 10. In CP-added blocks adjacent to each other, the second fixed sequence is placed at the tail of the previous block, and the first fixed sequence is placed at the head of the next block. Interpolation processing is performed on a block before CP addition so as to provide recursive cyclicity in the phase in the block, which causes the head of the block before CP addition and the tail of the block before CP addition to have a continuous phase and amplitude. This can eliminate discontinuity of phase across blocks in CP-added blocks. Note that interpolation processing may also be provided on a CP-added block, in which case the same fixed sequence may not necessarily appear at a specified position, which may cause inter-symbol interference to occur. However, this is not a phenomenon that affects discontinuity of phase across blocks. Note that, also in the first embodiment, the fixed sequence may be placed in multiple positions, and CP addition may be performed, similarly.

Note that the foregoing placement of the fixed sequence is merely an example, and the placement positions of the fixed sequence(s) are not limited to the example described above. Insertion of a fixed sequence in a block enables the fixed sequence to be used for tracking of transmission channel information. In addition, similarly to the first embodiment, linear processing may be performed to provide a zero-power section by setting the fixed sequence as a zero-sequence, i.e., a sequence formed of zeros. Similarly to the first embodiment, providing a zero-power section allows antenna switching, interference measurement, and/or the like to be performed in the zero-power section.

Note that in a case in which L in the interpolation processing is greater than 1, the calculation formulae described above for the case of L=1 may also be used to perform the processing in the linear processing unit 2a. Because the interpolation processing merely performs interpolation between symbols in time domain, such processing will present no practical problem. If an exact solution is demanded when L is greater than 1, this can be addressed by performing a matrix operation reflecting the interpolation in the interpolation processing unit 5.

As described above, the transmission device 100b of the present embodiment is configured such that the linear processing unit 2a generates an additional symbol to cause the fixed sequence to be placed in the transmission signal. This enables an advantage to be provided that is similar to the advantage of the first embodiment. This also eliminates the need to provide the fixed sequence addition unit 7 in the present embodiment.

Fourth Embodiment

Figure 12:
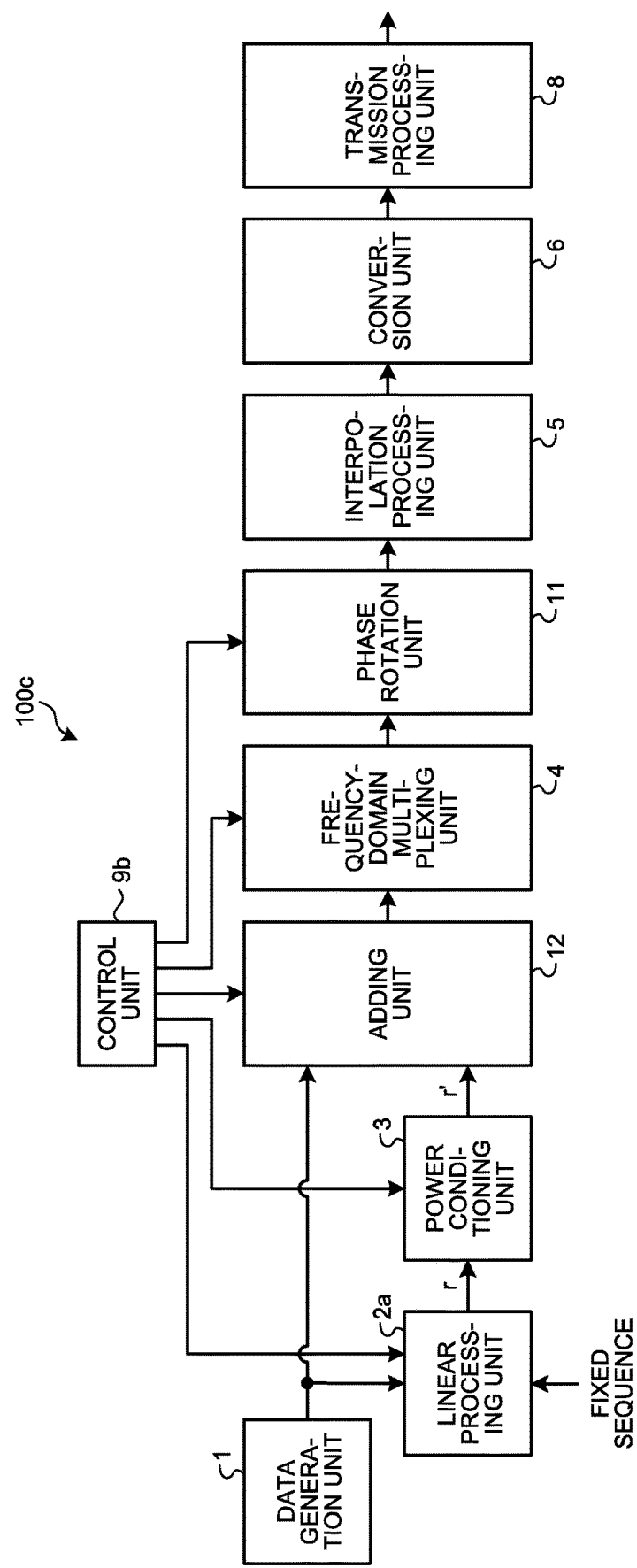
FIG. 12 is a diagram illustrating an example configuration of a transmission device according to a fourth embodiment.

FIG. 12 is a diagram illustrating an example configuration of a transmission device according to a fourth embodiment of the present invention. A transmission device 100c of the present embodiment includes a control unit 9b in place of the control unit 9a of the transmission device 100b of the second embodiment, and differs from the transmission device 100b of the second embodiment in that it additionally includes an adding unit 12. The other part of the transmission device 100c of the present embodiment is configured similarly to the transmission device 100b of the second embodiment. Note that the linear processing unit 2a performs its processing differently from the second embodiment as described below. Elements having functionality similar to the first and second embodiments are designated by the same reference characters as corresponding ones of the first and second embodiments, and duplicate description thereof will be omitted. The following description primarily describes differences from the first and second embodiments.

The first and second embodiments have been described in terms of examples in which additional symbols generated in linear processing are assigned to idle subcarriers, but in the present embodiment, an additional symbol generated in linear processing is added to a data symbol assigned to a subcarrier to which data is assigned. Specifically, the processing by the adding unit 12 can be expressed by addition of r and d, where d is the data vector, and r is the vector representing the additional symbols output from the linear processing unit 2a. Note that description of the process by the power conditioning unit 3 is omitted here. In the case in which power conditioning is performed, the adding unit 12 adds together the power-conditioned vector from the power conditioning unit 3 and the data vector.

The vector u representing the components corresponding to the fixed sequence in the signal output from the conversion unit 6 can be expressed by Formula (12) below.

$$u = A(d+r) \quad (12)$$

Similarly to the case in the first embodiment, the matrix A indicates positions of part of the IDFT matrix. How to obtain r in the present embodiment will now be described. Let M denote the length of u, and K denote the length of r, and assume M<K. In this case, r can be obtained from Formula (13) below.

[Formula 8]

$$r = A^H(AA^H)^{-1}(u-Ad) \quad (13)$$

In addition, when r can be obtained from Formula (14) below.

[Formula 9]

$$r = (A^H A)^{-1} A^H (u-Ad) \quad (14)$$

Moreover, also in the present embodiment, the transmission processing unit 8 may perform CP addition. As described in the third embodiment, and as illustrated in FIGS. 10 and 11, the fixed sequence may be inserted to remove discontinuity of phase across blocks. In addition, similarly to the case in the third embodiment, a zero-power section may be provided by setting the fixed sequence to a zero-sequence. In the instruction to the frequency-domain multiplexing unit 4, the control unit 9b does not specify the position of each of the data symbols and the additional symbols, but specifies the positions of symbols generated by addition of the data symbols and the additional symbols. The other operation of the control unit 9b is similar to the operation of the control unit 9 of the first embodiment.

As described above, the transmission device 100c of the present embodiment is configured to add the additional symbols generated in the linear processing to the data vector, to multiplex the symbols after the addition, to convert the result into a time domain signal, and to send the time domain signal. This can provide an advantage similar to the advantage of the first embodiment.

Fifth Embodiment

Figure 13:
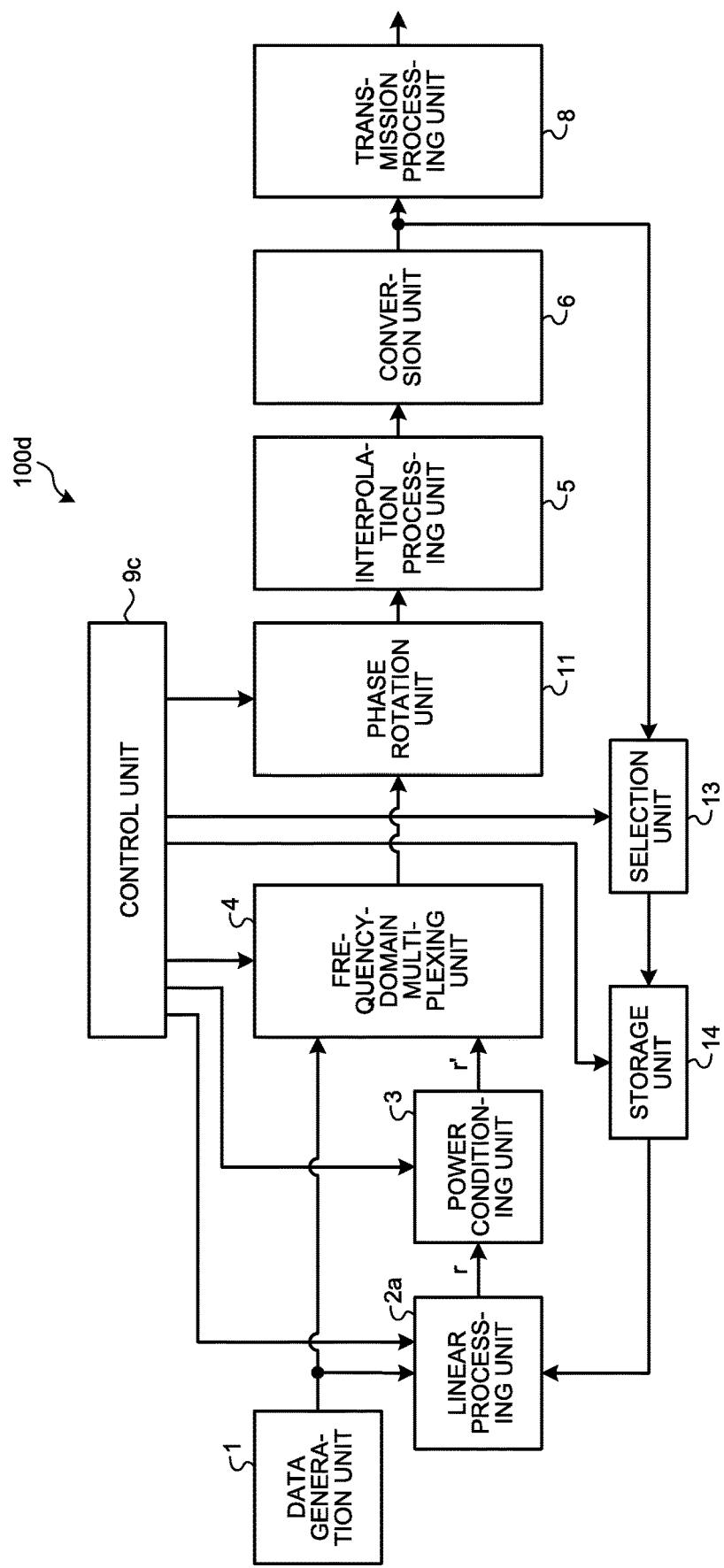
FIG. 13 is a diagram illustrating an example configuration of a transmission device according to a fifth embodiment.

FIG. 13 is a diagram illustrating an example configuration of a transmission device according to a fifth embodiment of the present invention. A transmission device 100d of the present embodiment includes a control unit 9c in place of the control unit 9a of the transmission device 100b of the second embodiment, and differs from the transmission device 100b of the second embodiment in that it additionally includes a selection unit 13 and a storage unit 14. The other part of the transmission device 100d of the present embodiment is configured similarly to the transmission device 100b of the second embodiment. Note that the linear processing unit 2a performs its processing differently from the second embodiment as described below. Elements having functionality similar to the first or second embodiment are designated by the same reference characters as corresponding ones of the first or second embodiment, and duplicate description thereof will be omitted. The following description primarily describes differences from the first or second embodiment.

The first through third embodiments have been described in terms of examples in which a fixed sequence is used as the added sequence, but in the present embodiment, part of a signal of the previous block is used as the added sequence instead of the fixed sequence. That is, in the present embodiment, upon generation of an additional symbol by the linear processing unit 2a to cause a data portion in a predetermined position in a block, which is a transmission unit of the time domain signal, to be set as a predetermined data group, the data group is part of the time domain signal of the immediately preceding block. In the present embodiment, the signal output from the conversion unit 6 is input to the transmission processing unit 8, and is also input to the selection unit 13. The selection unit 13 stores, in the storage unit 14 on a per-block basis, a data group that is part of the signal output from the conversion unit 6. Specifically, the selection unit 13 stores, in the storage unit 14, a signal portion in the position specified by the control unit 9c. The control unit 9c instructs the selection unit 13 about the position of the portion for use as the added sequence in the next block, of the signal output from the conversion unit 6.

Assume that the block currently being processed is a k (k is an integer greater than or equal to 0)-th block, and let $y_{k-1}$ denote the signal output from the conversion unit 6 in the processing for the immediately preceding block. Let $y'_{k-1}$ denote the signal portion that is part of the signal $y_{k-1}$, and is selected by the selection unit 13. The signal portion $y'_{k-1}$ is stored in the storage unit 14. Under these conditions, can be expressed by Formula (15) below.

$$y'_{k-1} = Ad \qquad (15)$$

The matrix A is part of the IDFT matrix $W_N$, and is a matrix having rows of the matrix A corresponding to the positions of added sequence components of the signal output from the conversion unit 6 in the rows of $W_N$. The vector d is a vector including the data symbols and the signal output from the linear processing unit 2a, in the k-th block. In this regard, the matrix A is decomposed as Formula (16) below.

$$y'_{k-1} = A_0 d' + A_1 r \qquad (16)$$

In the formula, r is a vector representing the signal output from the linear processing unit 2a, and d' represents the data symbols. The columns of $A_0$ are the columns corresponding to the positions of the data symbols in the output of the conversion unit 6, of the columns of A, and the columns of $A_1$ are the columns corresponding to the positions of the added sequence in the output of the conversion unit 6, of the columns of A. Let M denote the length of $y'_{k-1}$, and K denote the length of r, and assume M<K. In this case, r can be obtained from Formula (17) below.

[Formula 10]

$$r = A_1^H (A_1 A_1^H)^{-1} (y'_{k-1} - A_0 d') \qquad (17)$$

In addition, when M≥K, r can be obtained from Formula (18) below.

[Formula 11]

$$r = (A_1^H A_1)^{-1} A_1^H (y'_{k-1} - A_0 d') \qquad (18)$$

The control unit 9c of the present embodiment operates similarly to the control unit 9a of the second embodiment except for the additional instruction to the selection unit 13 as described above.

Figure 14:
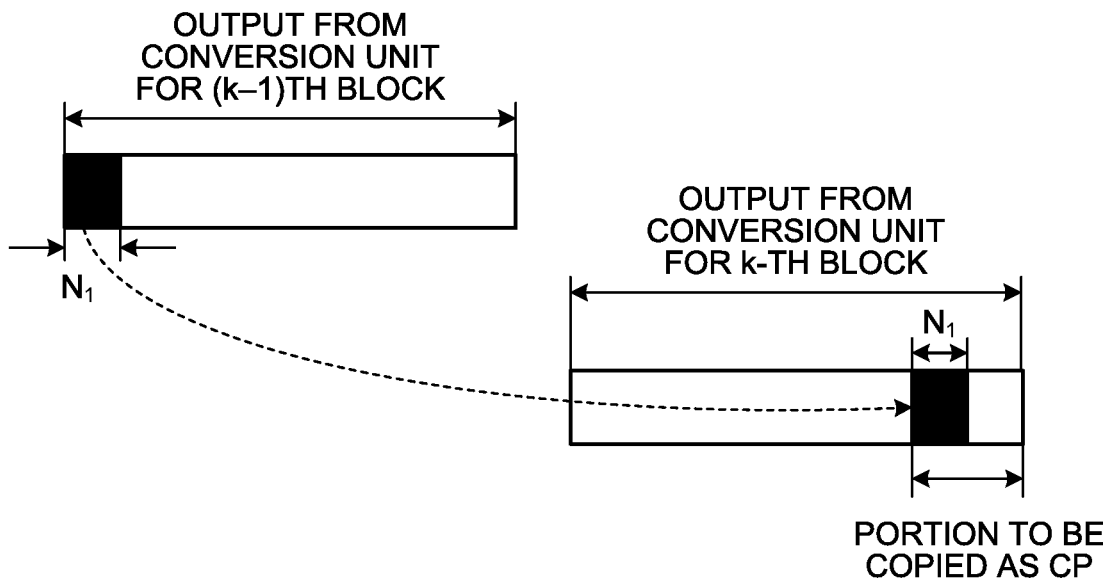
FIG. 14 is a diagram illustrating an example of output of the conversion unit of the fifth embodiment.

Also in the present embodiment, the transmission processing unit 8 may perform CP addition. FIG. 14 is a diagram illustrating an example of the output of the conversion unit 6 of the present embodiment. In the present embodiment, for example, the control unit 9c instructs the selection unit 13 to store, in the storage unit 14, the first $N_1$ pieces of data in the output of the conversion unit 6 of the (k−1)th block as the added sequence, as illustrated in FIG. 14. This causes part of the output from the conversion unit 6 of the previous block to be stored in the head of the portion copied as the CP in the k-th block. Thus, after the CP addition, the added sequence that is part of the (k−1)th block appears at the head of the k-th block. Performing interpolation processing to cause the head and the tail to have a continuous phase and amplitude in the (k−1)th block will cause the tail of the (k−1)th block and the head of the k-th block to have a continuous phase, and will thus remove discontinuity of phase across blocks, and can reduce out-of-band power. Note that the third embodiment has been described as placing the fixed sequence in two places to reduce out-of-band power, while in the present embodiment, the added sequence only needs to be added in a single place, thereby allowing the calculation in the linear processing to be simplified as compared to the third embodiment.

Figure 15:
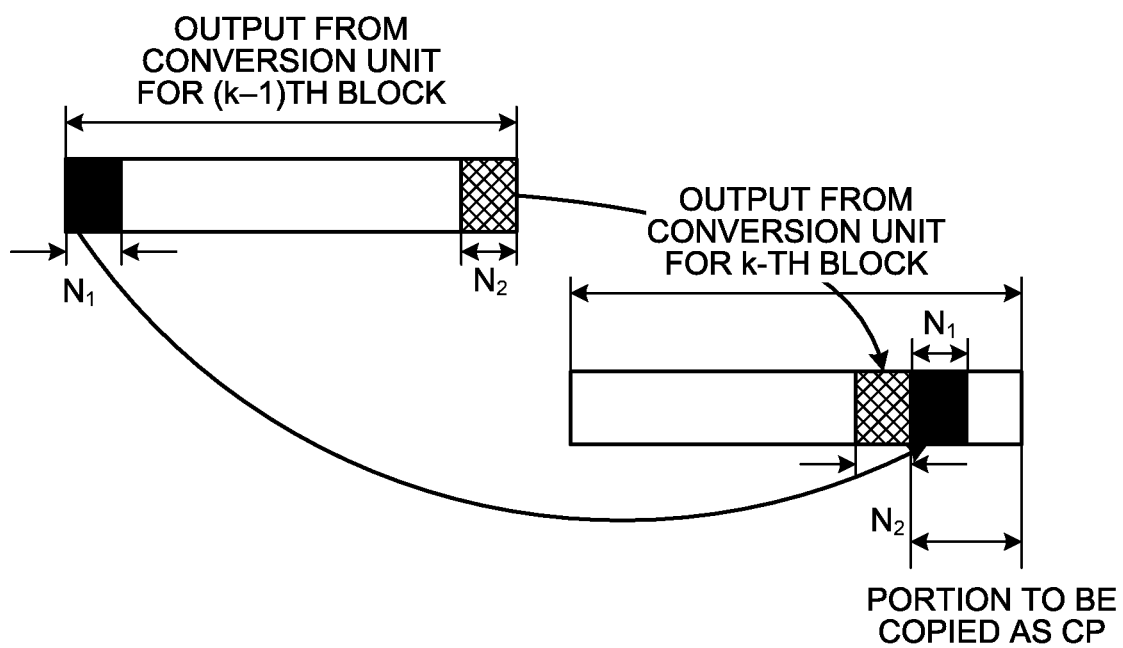
FIG. 15 is a diagram illustrating another example of output of the conversion unit of the fifth embodiment.

FIG. 15 is a diagram illustrating another example of the output of the conversion unit 6 of the present embodiment. In the example illustrated in FIG. 15, a first added sequence, which is the first $N_1$ pieces of data of the (k−1)th block, and a second added sequence, which is the last $N_2$ pieces of data, are stored in the storage unit 14. Then, in the k-th block, the second added sequence is placed such that a data portion immediately preceding the portion to be copied as the CP will be the tail of the second added sequence, and the first added sequence is placed at the head of the portion to be copied as the CP. Placement of added sequences in this manner enables multiple symbols to have the same phase and amplitude, and discontinuity of phase across blocks to be removed more effectively.

As described above, the transmission device 100d of the present embodiment is configured to use part of the data of the immediately preceding block instead of using a fixed sequence. This can provide an advantage similar to the advantage of the first embodiment, and moreover, can reduce out-of-band power by using a smaller number of added sequences than the third embodiment. In addition, the present embodiment enables an added sequence to be used as the guard interval without preparation of a predetermined sequence.

Sixth Embodiment

Figure 16:
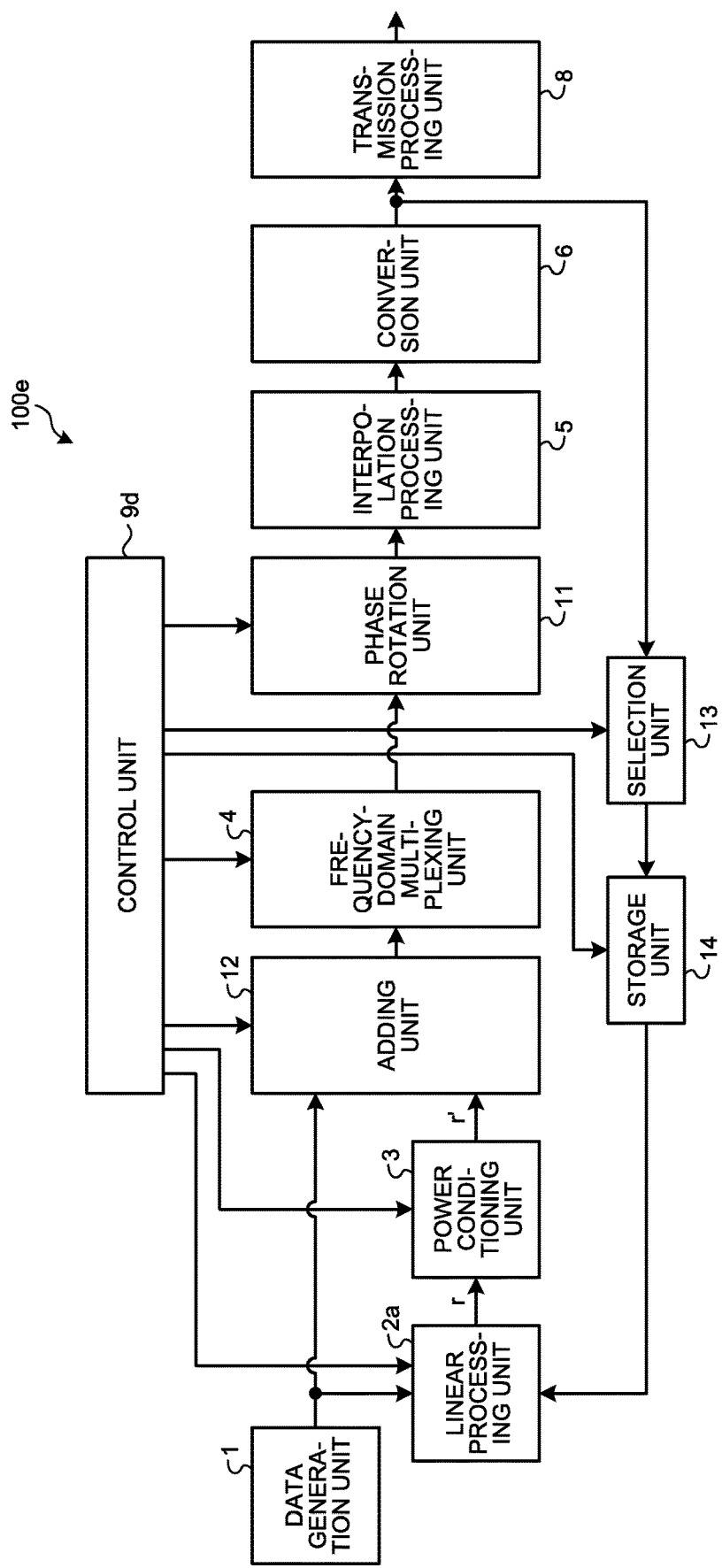
FIG. 16 is a diagram illustrating an example configuration of a transmission device according to a sixth embodiment.

FIG. 16 is a diagram illustrating an example configuration of a transmission device according to a sixth embodiment of the present invention. A transmission device 100e of the present embodiment includes a control unit 9d in place of the control unit 9c of the transmission device 100d of the fifth embodiment, and differs from the transmission device 100d of the fifth embodiment in that it additionally includes the adding unit 12. The other part of the transmission device 100e of the present embodiment is configured similarly to the transmission device 100d of the fifth embodiment. Note that the linear processing unit 2a performs its processing differently from the fourth embodiment as described below. Elements having functionality similar to the first, the fourth, or the fifth embodiment are designated by the same reference characters as corresponding ones of the first, the fourth, or the fifth embodiment, and duplicate description thereof will be omitted. The following description primarily describes differences from the first, the fourth, or the fifth embodiment.

In the present embodiment, the adding unit 12 adds together the data symbols and the symbols output from the power conditioning unit 3 similarly to the fourth embodiment. The following description assumes that no power conditioning is performed.

In addition, in the present embodiment, part of the data of the previous block is used as the added sequence similarly to the fifth embodiment. Accordingly, $y'_{k-1}$ can be expressed by Formula (19) below, where d represents the data symbols, and r is a vector representing the signal output from the linear processing unit 2a.

$$y'_{k-1}=A(d+r) \quad (19)$$

Let M denote the length of $y'_{k-1}$, and K denote the length of r, and assume M<K. In this case, r can be obtained from Formula (20) below.

[Formula 12]

$$r=A^H(AA^H)^{-1}(y'_{k-1}-Ad) \quad (20)$$

In addition, when M≥K, r can be obtained from Formula (21) below. The control unit 9d of the present embodiment has functionality similar to the functionality of the control unit 9c of the fifth embodiment, and also has functionality similar to the control unit 9b of the fourth embodiment.

[Formula 13]

$$r=(A^H A)^{-1}A^H(y'_{k-1}-Ad) \quad (21)$$

Also in the present embodiment, the transmission processing unit 8 may perform CP addition similarly to the fifth embodiment.

As described above, the transmission device 100e of the present embodiment is configured to add together the data symbols and the additional symbols similarly to the fourth embodiment, and to use data of part of the previous block as the added sequence similarly to the fifth embodiment. This can provide an advantage similar to the advantage of the first embodiment, and can reduce out-of-band power by using a smaller number of added sequences than the third embodiment.

The hardware configuration of the transmission device of each of the second through sixth embodiments is similar to the hardware configuration of the transmission device of the first embodiment, and part of the transmission processing unit 8 and the components other than the transmission processing unit 8 can be implemented in the processing circuit described in the first embodiment. This processing circuit may be a control circuit or may be a dedicated hardware element similarly to the first embodiment.

Seventh Embodiment

Figure 17:
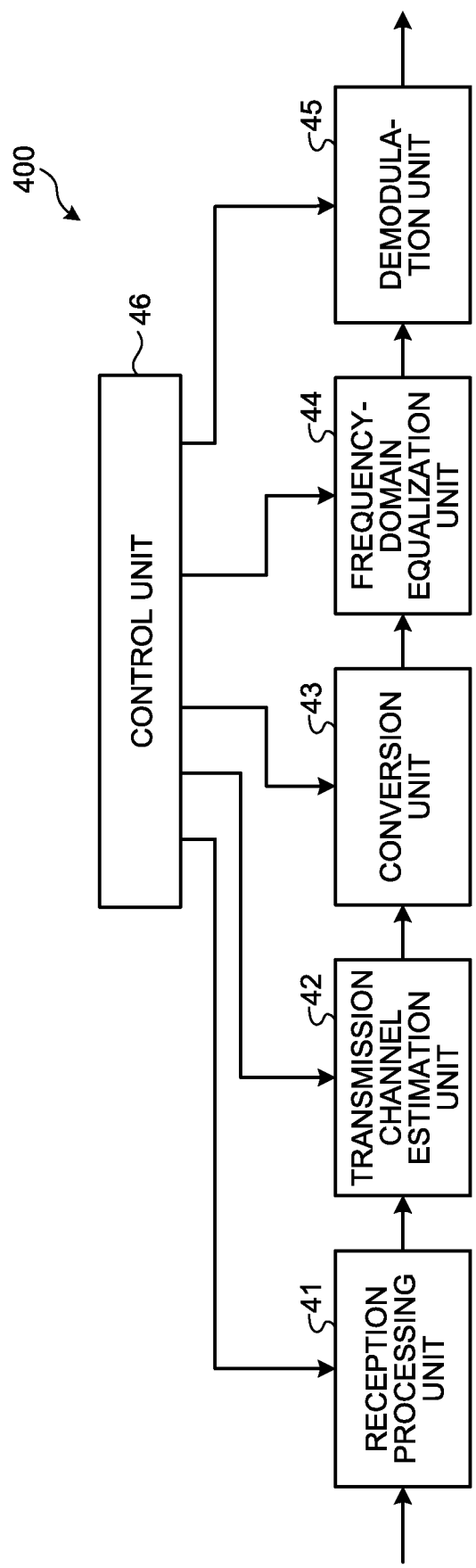
FIG. 17 is a diagram illustrating an example configuration of a receiving device of a seventh embodiment.

A seventh embodiment will be described in terms of an example of a receiving device for receiving a signal transmitted from the transmission device 100 or 100a described in the first embodiment. FIG. 17 is a diagram illustrating an example configuration of a receiving device of the seventh embodiment. As illustrated in FIG. 17, a receiving device 400 of the present embodiment includes a reception processing unit 41, a transmission channel estimation unit 42, a conversion unit 43, a frequency-domain equalization unit 44, a demodulation unit 45, and a control unit 46.

In addition, in a case in which the transmission device 100 or 100a performs power conditioning as described in the first embodiment, interference may be caused by a data symbol in the position where the fixed sequence has been placed. In such case, estimation accuracy will be improved, on the receiving side, by removing the data symbol leaked into the fixed sequence using a demodulation result, and then performing transmission channel estimation again using the interference-canceled fixed sequence.

Figure 18:
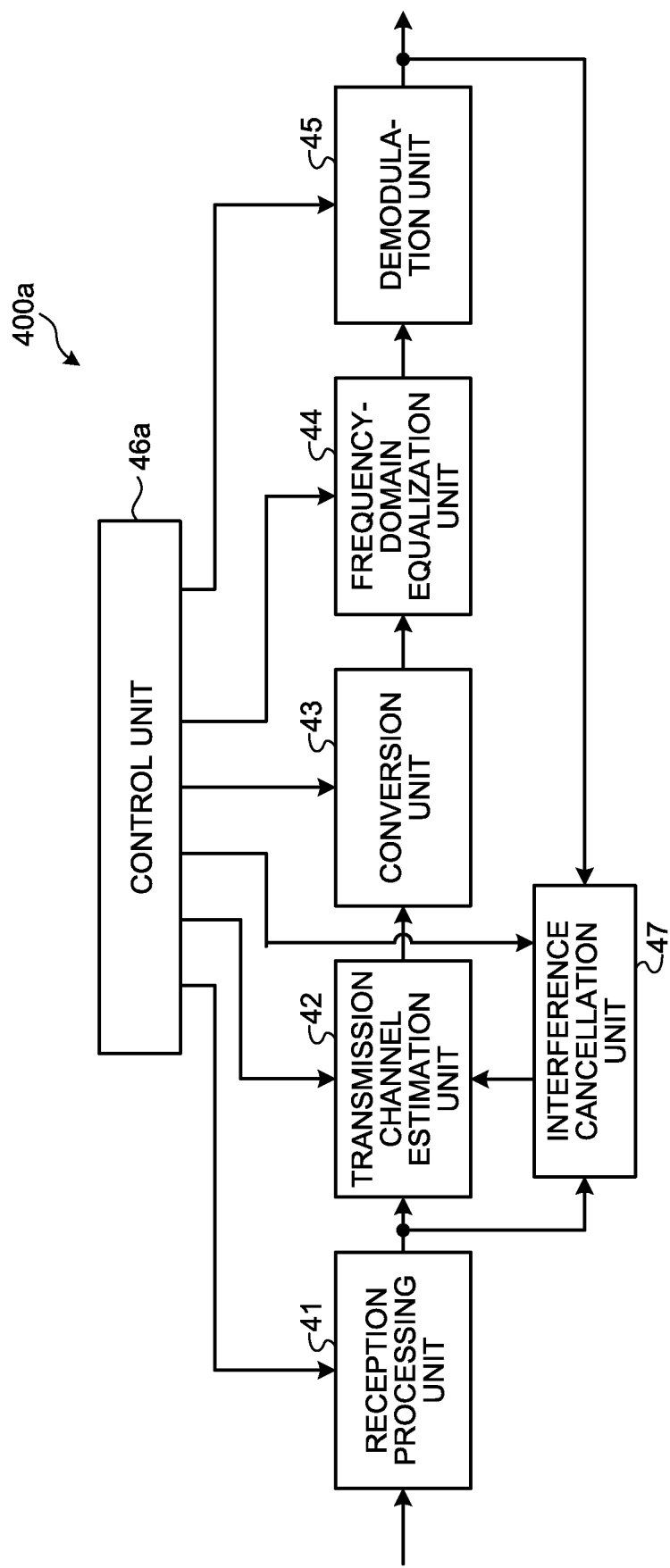
FIG. 18 is a diagram illustrating an example configuration of a receiving device that performs interference cancellation of the seventh embodiment.

FIG. 18 is a diagram illustrating an example configuration of a receiving device that performs interference cancellation. A receiving device 400a illustrated in FIG. 18 is configured similarly to the receiving device 400 except that it additionally includes an interference cancellation unit 47 in the receiving device 400, and includes a control unit 46a in place of the control unit 46. An operation will be described below using a configuration of the receiving device 400a as an example. As described below, the receiving device 400 operates partly the same as the receiving device 400a.

Figure 19:
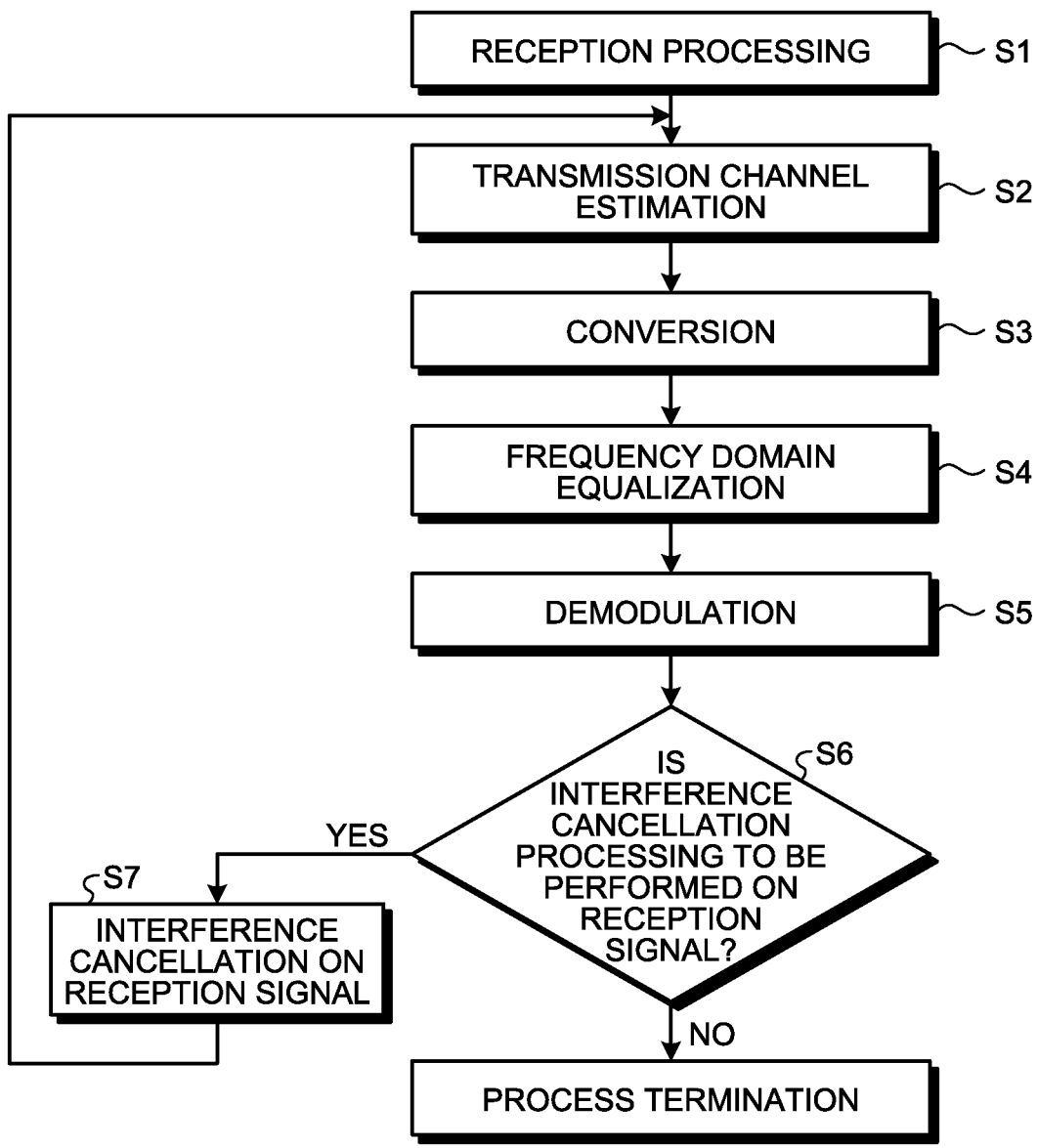
FIG. 19 is a flowchart illustrating an example of processing procedure of the receiving device of the seventh embodiment.

FIG. 19 is a flowchart illustrating an example of processing procedure of the receiving device 400a of the present embodiment. The reception processing unit 41 receives a signal from the transmission device 100 or from the transmission device 100a, and performs reception processing such as analog-to-digital conversion processing and frequency conversion processing (step S1). The reception processing unit 41 outputs the processed signal to the transmission channel estimation unit 42.

The transmission channel estimation unit 42 performs transmission channel estimation in time domain on the basis of the reception signal output from the reception processing unit 41 (step S2). Note that the transmission channel estimation is performed using the fixed sequence placed in the transmission device 100 or 100a. The method of the transmission channel estimation using the fixed sequence can be a general transmission channel estimation method using a known sequence. The transmission channel estimation unit 42 outputs the reception signal and the transmission channel estimation result to the conversion unit 43.

The conversion unit 43 converts the reception signal input from the transmission channel estimation unit 42 into a frequency domain signal (step S3). The conversion unit 43 outputs the frequency domain signal and the transmission channel estimation result to the frequency-domain equalization unit 44. The frequency-domain equalization unit 44 performs frequency-domain equalization processing using the frequency domain signal and the transmission channel estimation result (step S4). The frequency domain equalization can be performed using a common method. The frequency-domain equalization unit 44 outputs the reception signal after the frequency-domain equalization processing to the demodulation unit 45.

The demodulation unit 45 demodulates the reception signal after the frequency-domain equalization processing (step S5). Thus, the transmitted data is restored. Note that the control unit 46a knows the subcarrier(s) to which the data symbol(s) has or have been assigned in the transmission device 100 or 100a, and thus indicates, to the demodulation unit 45, the subcarrier(s) to which the data symbol(s) has or have been assigned. Information indicating the subcarrier(s) to which the data symbol(s) has or have been assigned may be predetermined, or may be informed to the receiving device 400a from the transmission device 100 or 100a.

In the present embodiment, the control unit 46a is capable of selecting whether to perform interference cancellation processing on the reception signal. Specifically, for example, the control unit 46a determines to perform the interference cancellation on a reception signal corresponding to a fixed sequence, and not to perform the interference cancellation processing on the other reception signals. If the interference cancellation processing is not to be performed on the reception signal (No at step S6), the control unit 46a terminates the process after step S5. If the interference cancellation processing is to be performed on the reception signal (Yes at step S6), the control unit 46a instructs the interference cancellation unit 47 to perform the interference cancellation, and the interference cancellation unit 47 performs the interference cancellation on the reception signal (step S7). Then, the process at and after step S2 is performed.

Interference cancellation on a reception signal of the present embodiment will now be described. The interference cancellation unit 47 receives the reception signal from the reception processing unit 41, and receives a result of demodulation, i.e., demodulation result, from the demodulation unit 45. The interference cancellation unit 47 removes an interference component in a position corresponding to the fixed sequence from the reception signal, on the basis of the demodulation result and the component of interference on the fixed sequence from a data symbol.

Specifically, the interference cancellation unit 47 cancels interference according to Formula (22) below, where d (hat) represents the demodulation result of the data symbols, z represents the reception signal, and z' represents the reception signal after the interference cancellation. The matrix C is a matrix including the transmission channel estimation result and all of the IDFT matrix or part of the IDFT matrix, and is a matrix including a portion requiring interference cancellation in the reception signal z. The matrix C is specified from the control unit 46a to the interference cancellation unit 47. The matrix C is a matrix obtained by multiplication of the IDFT matrix by a matrix formed of a transmission channel estimated value. Some components of the IDFT matrix described above depend on whether to include oversampling processing and/or the like in the IDFT matrix.

[Formula 14]

$$z' = z - C\hat{d} \quad (22)$$

Whether the transmission channel estimation unit 42 should perform transmission channel estimation using the reception signal output from the reception processing unit 41 or using the signal output from the interference cancellation unit 47 is specified by the control unit 46a.

Note that the foregoing example has been described in which the transmission channel estimation unit 42 performs the transmission channel estimation using the fixed sequence in time domain described above, but may also perform the transmission channel estimation using multiple fixed sequences embedded in multiple blocks, and output the average value of the resultant multiple transmission channel estimation results as the transmission channel estimation result.

The receiving device 400 illustrated in FIG. 17 operates similarly to the receiving device 400a when no operation relating to the interference cancellation is performed.

A hardware configuration of the receiving devices 400 and 400a will next be described. In the receiving devices 400 and 400a, the reception processing unit 41 is a receiver. The components of the receiving devices 400 and 400a other than the reception processing unit 41, and part of the reception processing unit 41, can be implemented in the processing circuit described in the first embodiment. This processing circuit may be a control circuit or may be a dedicated hardware element similarly to the first embodiment.

As described above, the receiving devices 400 and 400a of the present embodiment are each configured to perform interference cancellation processing on a fixed sequence portion during reception processing of receiving a signal transmitted from the transmission device 100 or 100a. This can reduce the effect of interference on the fixed sequence portion caused by a data symbol even when power conditioning is performed in the transmission device 100 or 100a, and can thus reduce or eliminate degradation in accuracy of the transmission channel estimation.

Note that the foregoing example has been described in terms of an example in which the receiving devices 400 and 400a each receive a signal transmitted from the transmission device 100 or 100a, but the receiving devices 400 and 400a may each be a receiving device for receiving a signal transmitted from the transmission device 100b of the second embodiment. Note that in a case in which a CP has been added in the transmission device, CP removal is performed in the reception processing unit 41.

Eighth Embodiment

Figure 20:
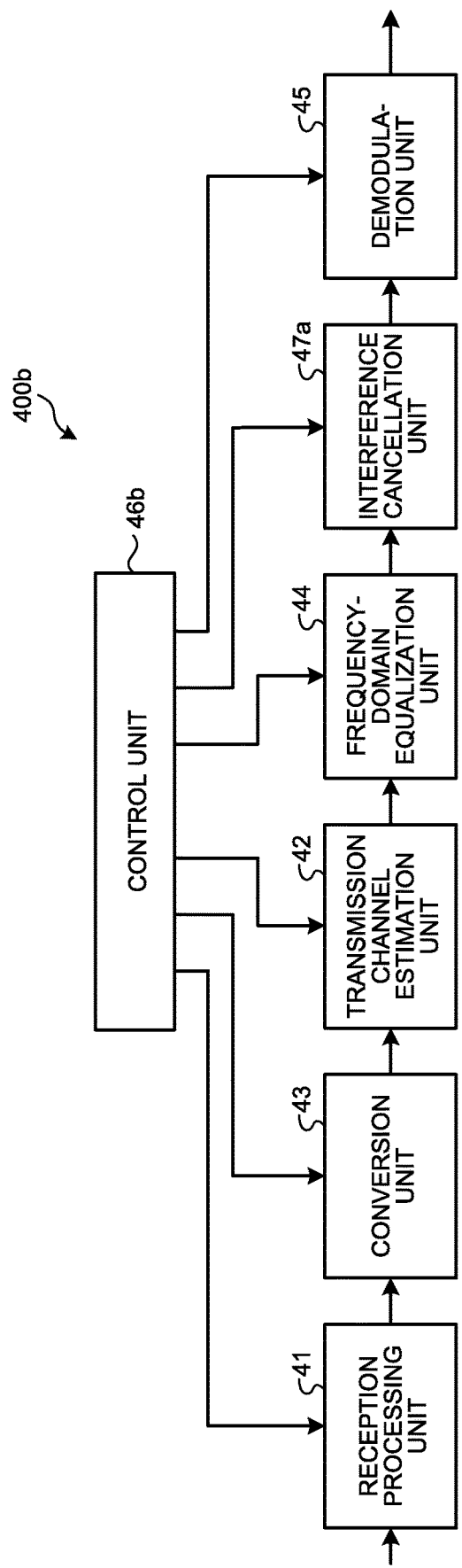
FIG. 20 is a diagram illustrating an example configuration of a receiving device of an eighth embodiment.

An eighth embodiment will be described in terms of an example of a receiving device for receiving a signal transmitted from the transmission device 100c described in the fourth embodiment. FIG. 20 is a diagram illustrating an example configuration of a receiving device of the eighth embodiment. As illustrated in FIG. 20, a receiving device 400b of the present embodiment is similar to the receiving device 400a of the seventh embodiment except including an interference cancellation unit 47a and a control unit 46b respectively in place of the interference cancellation unit 47 and the control unit 46a. Elements having functionality similar to the seventh embodiment are designated by the same reference characters as corresponding ones of the seventh embodiment, and duplicate description thereof will be omitted. However, the example configuration illustrated in FIG. 20 is illustrated in which the conversion unit 43 converts the reception signal into a frequency domain signal, after which the transmission channel estimation unit 42 performs the transmission channel estimation. Thus, the transmission channel estimation unit 42 performs the transmission channel estimation in frequency domain. The following description describes differences from the seventh embodiment.

Figure 21:
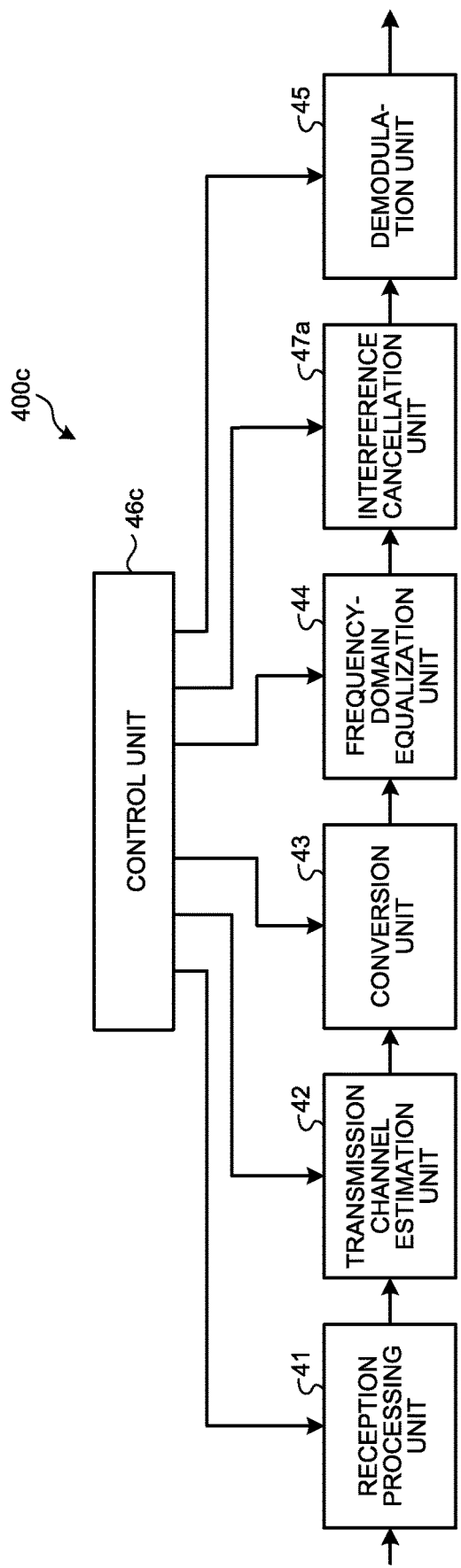
FIG. 21 is a diagram illustrating an example configuration of a receiving device that performs transmission channel estimation in time domain, of the eighth embodiment.

The example configuration illustrated in FIG. 20 is illustrated as performing the transmission channel estimation in frequency domain, but as illustrated in FIG. 21, the transmission channel estimation may also be performed in time domain. FIG. 21 is a diagram illustrating an example configuration of a receiving device 400c of the eighth embodiment that performs the transmission channel estimation in time domain. The receiving device 400c operates similarly to the receiving device 400b illustrated in FIG. 20 except that the conversion unit 43 performs conversion after the transmission channel estimation, and the transmission channel estimation unit 42 performs the transmission channel estimation in frequency domain.

The interference cancellation unit 47a of the present embodiment performs interference cancellation processing, in which an interference component is removed from the reception signal. The result of demodulation performed on a signal after the interference cancellation by the demodulation unit 45 can be expressed by Formula (23) below. Assume that $P=A^H(AA^H)^{-1}$ when M<K, and $P=(A^HA)^{-1}A^H$ when M≥K, where x represents the reception signal after the frequency domain equalization, M represents the length of the fixed sequence, and K represents the length of r described in the fourth embodiment. The matrix I is an $N_D \times N_D$ unit matrix.

[Formula 15]

$$\hat{d}=(I-PA)^{-1}(x-Pu) \quad (23)$$

Note that the interference cancellation unit 47a may also remove the interference component from the reception signal using Formula (24) below using a demodulation result d (hat) from the demodulation unit 45 described above.

[Formula 16]

$$x'=x-P(u-A\hat{d}) \quad (24)$$

Figure 22:
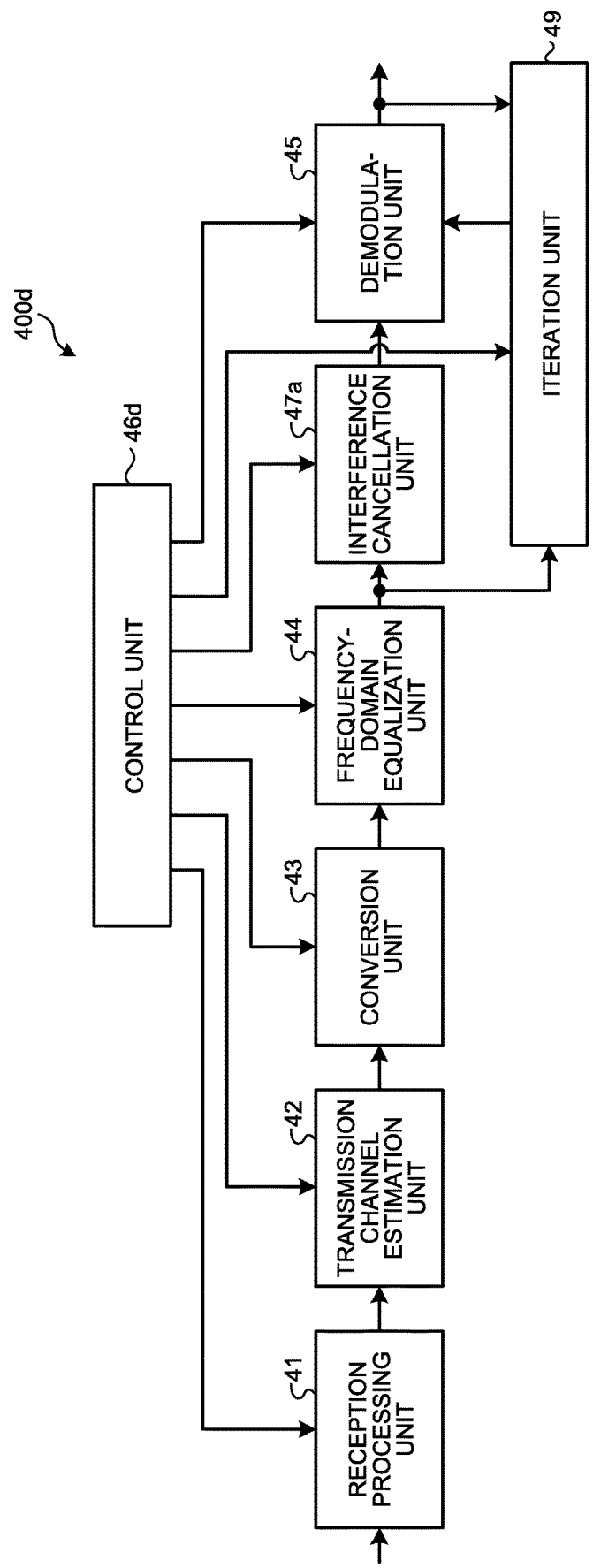
FIG. 22 is a diagram illustrating an example configuration of a receiving device that performs iterative demodulation, of the eighth embodiment.

Note that demodulation may be performed again using the signal x' illustrated in Formula (24). FIG. 22 is a diagram illustrating an example configuration of a receiving device that performs iterative demodulation. A receiving device 400d illustrated in FIG. 22 is similar to the receiving device 400c except that it additionally includes an iteration unit 49 in the receiving device 400c, and includes a control unit 46d in place of a control unit 46c. Note that whether the iteration unit 49 should perform the iterative operation or not and the number of times of iteration are specified from the control unit 46d to the iteration unit 49. The iteration unit 49 receives the demodulation result from the demodulation unit 45, and receives the signal after the frequency domain equalization from the frequency-domain equalization unit 44.

Figure 23:
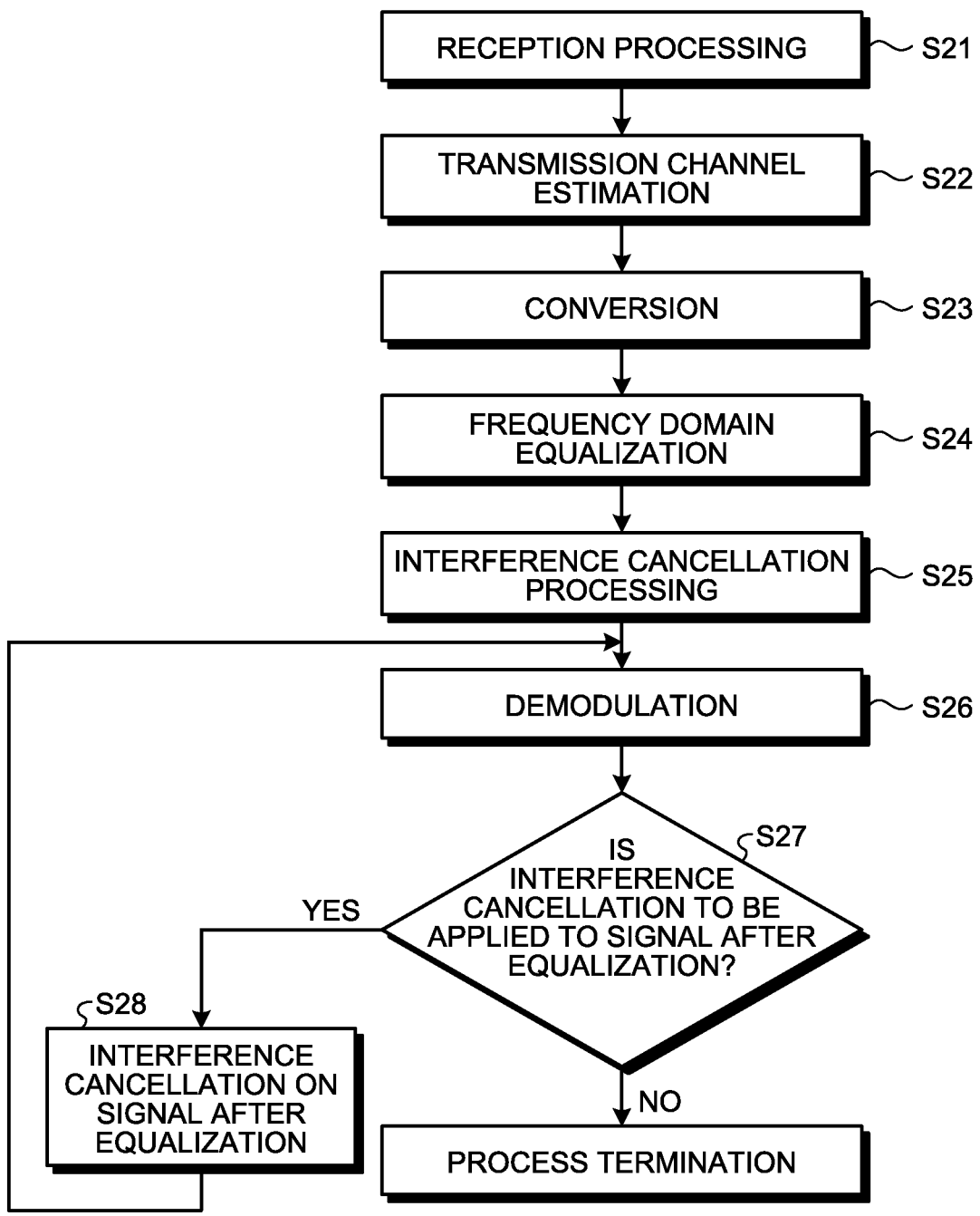
FIG. 23 is a flowchart illustrating an example of processing procedure of the receiving device of the eighth embodiment.

FIG. 23 is a flowchart illustrating an example of processing procedure of the receiving device 400d. Steps S21 to S24 illustrated in FIG. 23 are similar to steps S1 to S4 of the seventh embodiment. After step S24, the interference cancellation unit 47a performs interference cancellation processing as described above (step S25). The demodulation unit 45 demodulates the reception signal after the interference cancellation (step S26). The iteration unit 49 determines whether to apply the interference cancellation to the signal after the equalization, i.e., the signal output from the frequency-domain equalization unit 44 (step S27). When being instructed by the control unit 46d to perform the iterative operation, the iteration unit 49 determines to apply the interference cancellation to the signal after the equalization.

If no interference cancellation is to be applied to the signal after the equalization (No at step S27), the iteration unit 49 does not perform iteration operation, and the process is terminated. If interference cancellation is to be applied to the signal after the equalization (Yes at step S27), the iteration unit 49 performs the interference cancellation on the signal after the equalization by calculating the signal x' using Formula (24) (step S28). The iteration unit 49 inputs the signal x', which is the result of the interference cancellation processing, to the demodulation unit 45. The process at and after step S26 is then repeated.

As described above, in the present embodiment, the interference cancellation unit 47a performs interference cancellation processing on the reception signal after the frequency domain equalization. This can reduce the effect of interference on the fixed sequence portion caused by a data symbol even when power conditioning is performed in the transmission device 100c, and can thus reduce or eliminate degradation in accuracy of the transmission channel estimation.

Ninth Embodiment

Figure 24:
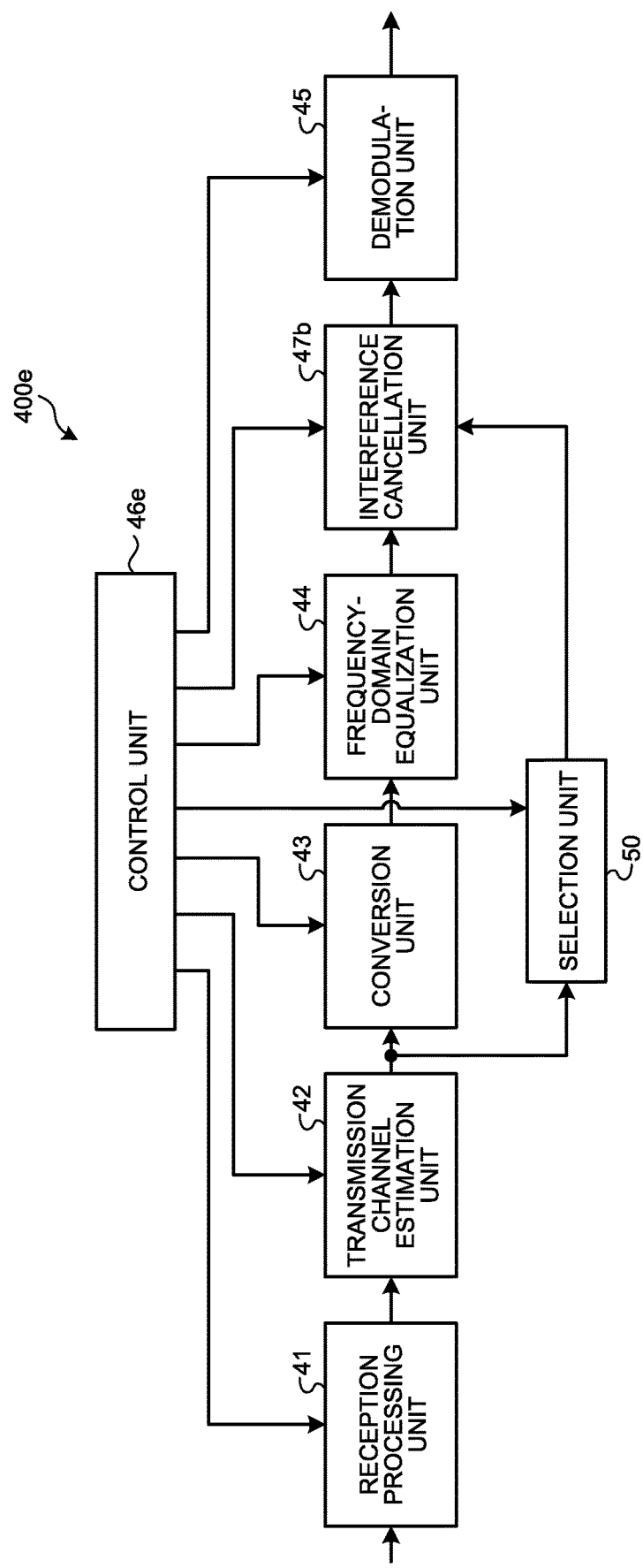
FIG. 24 is a diagram illustrating an example configuration of a receiving device of a ninth embodiment.

A ninth embodiment will be described in terms of an example of a receiving device for receiving a signal transmitted from the transmission device 100d or 100e described in the fifth or sixth embodiment. FIG. 24 is a diagram illustrating an example configuration of a receiving device of the ninth embodiment. As illustrated in FIG. 24, a receiving device 400e of the present embodiment is similar to the receiving device 400c of the eighth embodiment except that it additionally includes a selection unit 50, and includes a control unit 46e and an interference cancellation unit 47b in place of the control unit 46c and the interference cancellation unit 47a. Elements having functionality similar to the eighth embodiment are designated by the same reference characters as corresponding ones of the eighth embodiment, and duplicate description thereof will be omitted. The following description describes differences from the eighth embodiment.

The transmission devices 100d and 100e described in the fifth and sixth embodiments each use part of the immediately preceding block as the added sequence. Demodulation of a signal transmitted from the transmission device 100e described in the sixth embodiment requires data of the immediately preceding block. In the receiving device 400d, the selection unit 50 selects and holds the signal portion used as the added sequence, of the reception signal of each block output from the transmission channel estimation unit 42. The selection unit 50 then outputs the signal being held to the interference cancellation unit 47b during processing for the next block. The position of the added sequence is specified from the control unit 46e to the selection unit 50. Note that the receiving device does not need to include either the selection unit 50 or the interference cancellation unit 47b when a signal transmitted from the transmission device 100d described in the fifth embodiment is received. This is because reference only to the subcarrier(s) to which the data has been assigned allows demodulation to be performed. In this case, the receiving device operates similarly to the receiving device 400 described in the seventh embodiment.

A case in which a signal transmitted from the transmission device 100e is received will be described. Let $y''_{k-1}$ denote the signal portion used as the added sequence, of the signal of the immediately preceding (k−1)th block, in the processing for the reception signal of the k-th block. Assume that $P=A^H(AA^H)^{-1}$ when M<K, and $P=(A^HA)^{-1}A^H$ when M≥K, where x represents the signal after the frequency domain equalization, M represents the length of $y''_{k-1}$, and K represents the length of r described in the fifth embodiment. The demodulation result d (hat) of the signal on which the interference cancellation unit 47b has performed the interference cancellation can be expressed by Formula (25) below.

[Formula 17]

$$\hat{d}=(I-PA)^{-1}(x-Py''_{k-1}) \quad (25)$$

In addition, the added sequence of the immediately preceding block may also be generated by using the demodulation result of the reception signal corresponding to the immediately preceding block. In this case, the demodulation result of each block is stored in a storage unit (not illustrated), and the interference cancellation unit 47b reads the stored demodulation result from the storage unit, and reproduces the added sequence using the demodulation result. Specifically, the added sequence is reproduced using Formula (26) below. The matrix B is a matrix specified by the control unit 46e, and includes part of the IDFT matrix.

[Formula 18]

$$\hat{y}''_{k-1}=B\hat{d}_{k-1} \quad (26)$$

Figure 25:
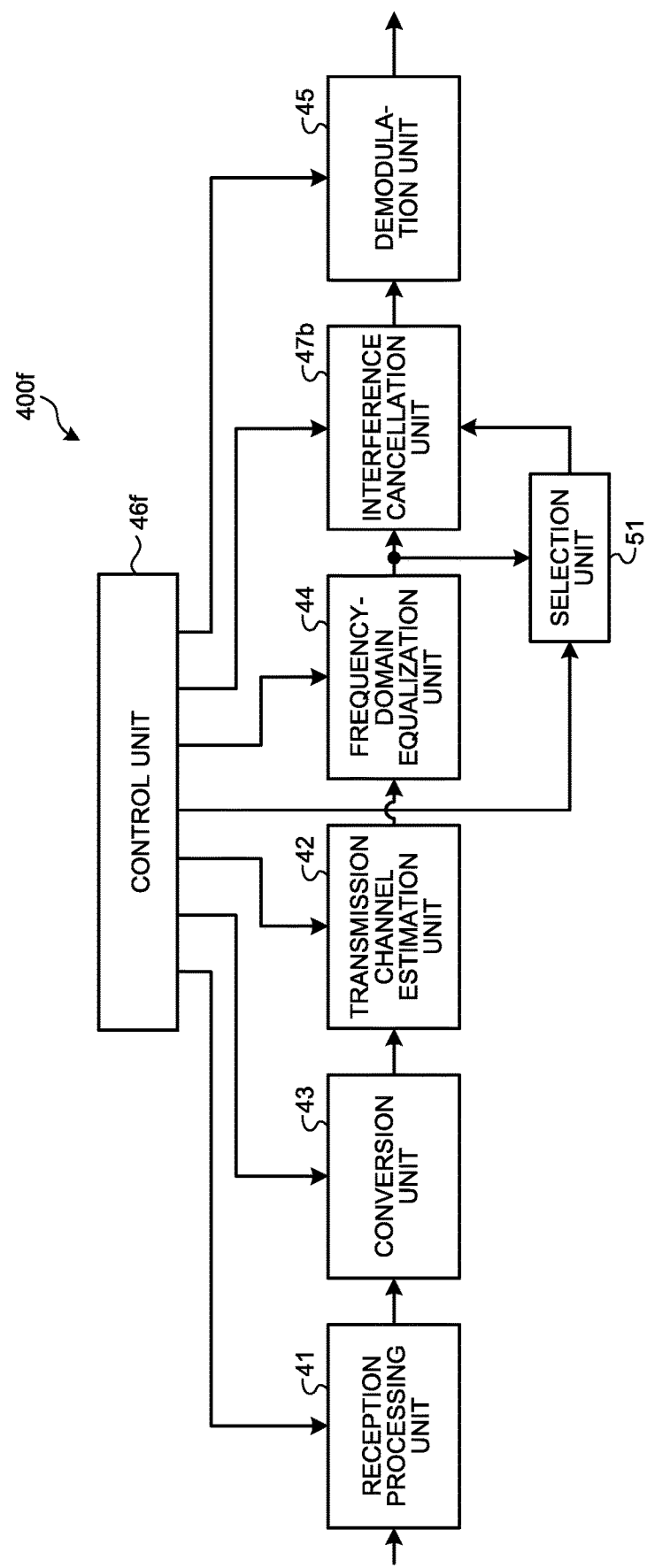
FIG. 25 is a diagram illustrating an example configuration of a receiving device that performs transmission channel estimation in frequency domain, of the ninth embodiment.

Also in the present embodiment, the iteration unit may also be included to allow the interference cancellation processing to be repeated. In addition, as illustrated in FIG. 25, the transmission channel estimation may be performed in frequency domain. FIG. 25 is a diagram illustrating an example configuration of a receiving device of the ninth embodiment that performs the transmission channel estimation in frequency domain. A receiving device 400f includes a selection unit 51 and a control unit 46f in place of the selection unit 50 and the control unit 46e of the receiving device 400e. The receiving device 400f operates similarly to the receiving device 400e except that the conversion unit 43 performs conversion before the transmission channel estimation, and the transmission channel estimation unit 42 thus performs the transmission channel estimation in frequency domain, that the selection unit 51 operates in place of the selection unit 50, and that the control unit 46f controls the selection unit 51 instead of the selection unit 50. In the receiving device 400f, the selection unit 51 converts the signal after frequency domain equalization into a time domain signal, and thereafter operates similarly to the selection unit 50.

As described above, the receiving device of the present embodiment is configured to hold the portion corresponding to the added sequence, of the reception signal corresponding to the immediately preceding block, and to perform the interference cancellation processing using the added sequence being held. This enables a signal transmitted from the transmission device 100e described in the sixth embodiment to be demodulated.

The hardware configuration of the receiving device of each of the eighth and ninth embodiments is similar to the hardware configuration of the receiving device of the seventh embodiment, and part of the reception processing unit 41 and the components other than the reception processing unit 41 can be implemented in the processing circuit described in the first embodiment. This processing circuit may be a control circuit or may be a dedicated hardware element similarly to the first embodiment.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1 data generation unit; 2, 2a linear processing unit; 3 power conditioning unit; 4 frequency-domain multiplexing unit; 5 interpolation processing unit; 5a zero insertion unit; 6 conversion unit; 6a IDFT unit; 7 fixed sequence addition unit; 8 transmission processing unit; 9, 9a, 9b, 9c, 9d, 46, 46a, 46b, 46c, 46d, 46e, 46f control unit; 10, 14 storage unit; 11 phase rotation unit; 12 adding unit; 13, 50, 51 selection unit; 41 reception processing unit; 42 transmission channel estimation unit; 44 frequency-domain equalization unit; 45 demodulation unit; 47, 47a, 47b interference cancellation unit; 49 iteration unit; 100, 100a, 100b, 100c, 100d, 100e transmission device; 400, 400a, 400b, 400c, 400d, 400e, 400f receiving device.

The invention claimed is:

1. A transmission device comprising:
   a data generator to generate a data symbol;
   a linear processor to generate an additional symbol;
   a power conditioner to perform power conditioning on the additional symbol;
   a symbol arranger to arrange the additional symbol after the power conditioning and the data symbol along a frequency axis;
   a converter to convert a signal arranged along the frequency axis by the symbol arranger into a time domain signal; and
   a transmission processor to transmit the time domain signal, wherein
   the linear processor generates the additional symbol to cause a data portion in a predetermined position in a block to be set as a predetermined data group, the block being a transmission unit of the time domain signal.

2. The transmission device according to claim 1, wherein the data group is a sequence consisting of all zeros.

3. The transmission device according to claim 2, comprising:
   a sequence adder to add a predetermined sequence in the predetermined position of the time domain signal.

4. The transmission device according to claim 1, wherein the data group is a predetermined sequence.

5. The transmission device according to claim 4, comprising:
   an interpolation processor to perform interpolation processing to allow a phase to continue between a tail of the block and a head of the block, wherein
   the transmission processor adds a cyclic prefix to the time domain signal, and transmits the time domain signal after cyclic prefix addition,
   the sequence includes a first sequence and a second sequence, and
   the linear processor generates the additional symbol to cause the first sequence to be placed at a head of the block and at a head of a portion to be copied as a cyclic prefix, and cause the second sequence to be placed at a tail of the block and in a position immediately before the portion to be copied as a cyclic prefix.

6. The transmission device according to claim 1, wherein the data group is part of the time domain signal of an immediately preceding block.

7. The transmission device according to claim 6, comprising:
   an interpolation processor to perform interpolation processing to allow a phase to continue between a tail of the block and a head of the block, wherein the transmission processor adds a cyclic prefix to the time domain signal, and transmits the time domain signal after cyclic prefix addition, the data group is a signal including a head of the immediately preceding block, and the linear processor generates the additional symbol to cause the data group to be placed at a head of a portion to be copied as a cyclic prefix.

8. The transmission device according to claim 1, comprising:

an interpolation processor to perform interpolation processing to allow a phase to continue between a tail of the block and a head of the block, wherein the predetermined position is the head and the tail of the block.

9. The transmission device according to claim 1, wherein the symbol arranger assigns the data symbol and the additional symbol to different subcarriers.

10. The transmission device according to claim 4, comprising:

a symbol adder to add together the data symbol and the additional symbol, wherein the symbol arranger arranges a symbol generated by addition performed by the symbol adder, along the frequency axis.

11. The transmission device according to claim 1, comprising:

a phase rotator to provide phase rotation to cause the signal arranged in frequency domain by the symbol arranger to be cyclically shifted in time domain, wherein the converter converts a signal obtained through the phase rotation provided by the phase rotator, into a time domain signal.

12. A transmission device comprising:

a data generator to generate a data symbol;

a linear processor to generate an additional symbol;

a symbol arranger to arrange the additional symbol and the data symbol along a frequency axis;

a converter to convert a signal arranged along the frequency axis by the symbol arranger into a time domain signal; and a transmission processor to transmit the time domain signal, wherein the linear processor generates the additional symbol to cause a predetermined fixed sequence to appear in a predetermined position in a block, the block being a transmission unit of the time domain signal.

13. A transmission device comprising:

a data generator to generate a data symbol;

a linear processor to generate an additional symbol;

a symbol arranger to arrange the additional symbol and the data symbol along a frequency axis;

a converter to convert a signal arranged along the frequency axis by the symbol arranger into a time domain signal;

a transmission processor to transmit the time domain signal; and an interpolation processor to perform interpolation processing to allow a phase to continue between a tail of a block and a head of the block, the block being a transmission unit of the time domain signal, wherein the transmission processor adds a cyclic prefix to the time domain signal, and transmits the time domain signal after cyclic prefix addition, the linear processor generates the additional symbol to cause a data portion in a predetermined position in a block to be set as a predetermined sequence, the block being a transmission unit of the time domain signal, the sequence includes a first sequence and a second sequence, and the linear processor generates the additional symbol to cause the first sequence to be placed at a head of the block and at a head of a portion to be copied as a cyclic prefix, and cause the second sequence to be placed at a tail of the block and in a position immediately before the portion to be copied as a cyclic prefix.

14. A transmission device comprising:

a data generator to generate a data symbol;

a linear processor to generate an additional symbol;

a symbol arranger to arrange the additional symbol and the data symbol along a frequency axis;

a converter to convert a signal arranged along the frequency axis by the symbol arranger into a time domain signal; and a transmission processor to transmit the time domain signal, wherein the linear processor generates the additional symbol to cause a predetermined data group to appear a data portion in a predetermined position in a block, the block being a transmission unit of the time domain signal, and the data group is part of the time domain signal of an immediately preceding block.

15. A transmission device comprising:

a data generator to generate a data symbol;

a linear processor to generate an additional symbol;

a symbol adder to add together the data symbol and the additional symbol;

a symbol arranger to arrange a symbol generated by addition performed by the symbol adder, along a frequency axis;

a converter to convert a signal arranged along the frequency axis by the symbol arranger into a time domain signal; and a transmission processor to transmit the time domain signal, wherein the linear processor generates the additional symbol to cause a predetermined data group to appear in a predetermined position in a block, the block being a transmission unit of the time domain signal.

16. A receiving device for receiving, as a reception signal, a signal transmitted from the transmission device according to claim 9, the receiving device comprising:

a transmission channel estimator to perform transmission channel estimation on a basis of the reception signal;

a converter to convert the reception signal into a frequency domain signal;

an equalizer to perform frequency-domain equalization processing using the frequency domain signal and using a result of the transmission channel estimation;

a demodulator to perform demodulation using a result of the frequency-domain equalization processing; and an interference canceler to perform interference cancellation processing on the reception signal using a result of the demodulation, and to input a result of the interference cancellation processing to the transmission channel estimator, wherein the transmission channel estimator performs the transmission channel estimation using a result of the interference cancellation processing.

17. The receiving device according to claim 16, wherein the interference canceler performs the interference cancellation processing using a predetermined sequence that is placed in the time domain signal in the transmission device.

18. A receiving device for receiving, as a reception signal, a signal transmitted from the transmission device according to claim 10, the receiving device comprising:
a transmission channel estimator to perform transmission channel estimation on a basis of the reception signal;
a converter to convert the reception signal into a frequency domain signal;
an equalizer to perform frequency-domain equalization processing using the frequency domain signal and using a result of the transmission channel estimation;
an interference canceler to perform interference cancellation processing on a result of the frequency-domain equalization processing using the additional symbol added in the transmission device; and
a demodulator to perform demodulation using a result of the interference cancellation processing.

19. The receiving device according to claim 18, comprising:
an iterator to perform interference cancellation processing on the result of the frequency-domain equalization processing using a result of the demodulation, and to input a result of this interference cancellation processing to the demodulator, wherein
the demodulator performs demodulation using the result input from the iterator.

20. The receiving device according to claim 18 or 19, comprising:
a selector to select and store a data group being part of the reception signal on a per-block basis, wherein
the interference canceler performs the interference cancellation processing using the data group of an immediately preceding block stored by the selector.

21. A transmission method for a transmission device, the method comprising:
generating a data symbol;
generating an additional symbol;
performing power conditioning on the additional symbol;
arranging the additional symbol after the power conditioning and the data symbol along a frequency axis;
converting a signal arranged along the frequency axis by the arranging into a time domain signal; and
transmitting the time domain signal, wherein
the generating the additional symbol includes generating the additional symbol to cause a data portion in a predetermined position in a block to be set as a predetermined data group, the block being a transmission unit of the time domain signal.

22. The transmission device according to claim 6, comprising:
a symbol adder to add together the data symbol and the additional symbol, wherein
the symbol arranger arranges a symbol generated by addition performed by the symbol adder, along the frequency axis.

23. A receiving device for receiving, as a reception signal, a signal transmitted from the transmission device according to claim 22, the receiving device comprising:
a transmission channel estimator to perform transmission channel estimation on a basis of the reception signal;
a converter to convert the reception signal into a frequency domain signal;
an equalizer to perform frequency-domain equalization processing using the frequency domain signal and using a result of the transmission channel estimation;
an interference canceler to perform interference cancellation processing on a result of the frequency-domain equalization processing using the additional symbol added in the transmission device; and
a demodulator to perform demodulation using a result of the interference cancellation processing.

24. A receiving device for receiving, as a reception signal, a signal transmitted from the transmission device according to claim 15, the receiving device comprising:
a transmission channel estimator to perform transmission channel estimation on a basis of the reception signal;
a converter to convert the reception signal into a frequency domain signal;
an equalizer to perform frequency-domain equalization processing using the frequency domain signal and using a result of the transmission channel estimation;
an interference canceler to perform interference cancellation processing on a result of the frequency-domain equalization processing using the additional symbol added in the transmission device; and
a demodulator to perform demodulation using a result of the interference cancellation processing.

25. The receiving device according to claim 23, comprising:
an iterator to perform interference cancellation processing on the result of the frequency-domain equalization processing using a result of the demodulation, and to input a result of this interference cancellation processing to the demodulator, wherein
the demodulator performs demodulation using the result input from the iterator.

26. The receiving device according to claim 24, comprising:
an iterator to perform interference cancellation processing on the result of the frequency-domain equalization processing using a result of the demodulation, and to input a result of this interference cancellation processing to the demodulator, wherein
the demodulator performs demodulation using the result input from the iterator.

27. The receiving device according to claim 23, comprising:
a selector to select and store a data group being part of the reception signal on a per-block basis, wherein
the interference canceler performs the interference cancellation processing using the data group of an immediately preceding block stored by the selector.

28. The receiving device according to claim 24, comprising:
a selector to select and store a data group being part of the reception signal on a per-block basis, wherein
the interference canceler performs the interference cancellation processing using the data group of an immediately preceding block stored by the selector.

29. A control circuit for controlling a transmission device, the control circuit causing the transmission device to perform:
generating a data symbol;
generating an additional symbol;
performing power conditioning on the additional symbol;
arranging the additional symbol after the power conditioning and the data symbol along a frequency axis;
converting a signal arranged along the frequency axis by the arranging into a time domain signal; and
transmitting the time domain signal, wherein
the generating the additional symbol includes generating the additional symbol to cause a data portion in a predetermined position in a block to be set as a predetermined data group, the block being a transmission unit of the time domain signal.

30. A non-transitory computer-readable recording medium storing therein a program for controlling a transmission device, the program causing the transmission device to execute:

generating a data symbol;

generating an additional symbol;

performing power conditioning on the additional symbol;

arranging the additional symbol after the power conditioning and the data symbol along a frequency axis;

converting a signal arranged along the frequency axis by the arranging into a time domain signal; and transmitting the time domain signal, wherein the generating the additional symbol includes generating the additional symbol to cause a data portion in a predetermined position in a block to be set as a predetermined data group, the block being a transmission unit of the time domain signal.

* * * * *